US012580834B2

(12) United States Patent
Greyson et al.

(10) Patent No.:     US 12,580,834 B2
(45) Date of Patent:         Mar. 17, 2026

(54) CONVEYOR CONTROLLER WITH SIDEBAND COMMUNICATION SYSTEM

(71) Applicant: Bastian Solutions, LLC, Indianapolis, IN (US)

(72) Inventors: Tiffany Lee Greyson, Boise, ID (US); Samuel J. Osterhout, Indianapolis, IN (US); Benjamin Perry Baker, Indianapolis, IN (US); Adrian Rothenbuhler, Meridian, ID (US); Anton B. Eckerle, Fishers, IN (US); Jacob Matthew Clodfelter, Indianapolis, IN (US); Clinton Cooper, Westfield, IN (US)

(73) Assignee: Bastian Solutions, LLC, Indianapolis, IN (US)

( * ) Notice: Subject to any disclaimer, the term of this patent is extended or adjusted under 35 U.S.C. 154(b) by 357 days.

(21) Appl. No.: 18/300,803

(22) Filed: Apr. 14, 2023

(65) Prior Publication Data

US 2023/0412480 A1      Dec. 21, 2023

Related U.S. Application Data

(63) Continuation of application No. PCT/US2021/071941, filed on Oct. 20, 2021.
(Continued)

(51) Int. Cl.
*H04L 41/0677*      (2022.01)
*H04L 43/0817*      (2022.01)
*H04L 67/12*      (2022.01)

(52) U.S. Cl.
CPC ...... *H04L 43/0817* (2013.01); *H04L 41/0677* (2013.01); *H04L 67/12* (2013.01)

(58) Field of Classification Search
CPC ........ B65G 43/10; B65G 43/00; B65G 43/08; G05B 19/05; G05B 19/052; H04L 41/0677
See application file for complete search history.

(56) References Cited

U.S. PATENT DOCUMENTS

| 6,457,056 B1 | 9/2002 | Choi | |
| 6,701,214 B1 * | 3/2004 | Wielebski | B65G 47/261 |
| | | | 700/229 |

(Continued)

FOREIGN PATENT DOCUMENTS

WO          2020033745 A1      2/2020

OTHER PUBLICATIONS

Mofidul et al., "Design and Implementation of Remote Controlling and Monitoring System for Automatic PLC Based Packaging Industry", 2019 ICASERT, IEEE, May 1, 2019; pp. 1-5. (Year: 2019).*

(Continued)

*Primary Examiner* — Jason D Cardone
(74) *Attorney, Agent, or Firm* — Woodard, Emhardt, Henry, Reeves & Wagner, LLP

(57) ABSTRACT

A sideband communication system has been developed for a conveyor system. A controller card controls the operation of a conveyor zone and communicates information about each conveyor in the conveyor zone. The controller card is assigned to control and monitor the operation of one or more of these zones of conveyors. The cards of adjacent zones are daisy-chained together to facilitate communication with one another and with other systems like a programmable logic controller (PLC). In addition to the standard controller area network (CAN) communication protocol, the controller cards further communicate amongst themselves using a sideband communication protocol that is outside the realm of the standard CAN communication protocol. The sideband communication protocol allows the cards to communicate (Continued)

with each other without interfering with normal network communications which provides additional capabilities such as automatic card self-identification.

24 Claims, 21 Drawing Sheets

Related U.S. Application Data

(60) Provisional application No. 63/198,471, filed on Oct. 21, 2020.

(56) References Cited

U.S. PATENT DOCUMENTS

| | | | |
|---|---|---|---|
| 8,284,993 B2 | 10/2012 | Taylor et al. | |
| 8,695,786 B2 * | 4/2014 | Breen | B65G 47/261 |
| | | | 198/781.05 |
| 8,757,363 B2 * | 6/2014 | Combs | B65G 43/00 |
| | | | 198/781.01 |
| 8,983,651 B2 | 3/2015 | Combs et al. | |
| 9,823,640 B2 * | 11/2017 | Crater | G05B 19/052 |
| 10,160,607 B2 | 12/2018 | Danelski et al. | |
| 10,322,883 B2 | 6/2019 | Itoh et al. | |
| 10,341,135 B2 | 7/2019 | Kacel | |
| 11,327,890 B1 * | 5/2022 | Mukherjee | G06F 12/0897 |
| 11,343,152 B2 * | 5/2022 | Nainar | H04L 47/125 |
| 2002/0084173 A1 | 7/2002 | Paquette | |
| 2005/0192704 A1 | 9/2005 | Wielebski et al. | |
| 2007/0067540 A1 | 3/2007 | Bunker et al. | |
| 2009/0109861 A1 * | 4/2009 | Kini | H04L 41/0627 |
| | | | 370/242 |
| 2009/0182799 A1 | 7/2009 | Huang | |
| 2012/0290126 A1 * | 11/2012 | Combs | B65G 43/00 |
| | | | 198/781.01 |
| 2014/0156063 A1 * | 6/2014 | Neiser | B65G 43/10 |
| | | | 700/230 |
| 2014/0214178 A1 * | 7/2014 | Desrousseaux | G05B 11/01 |
| | | | 700/9 |
| 2014/0218248 A1 * | 8/2014 | Schulz | H01Q 3/26 |
| | | | 343/837 |
| 2015/0281197 A1 * | 10/2015 | Smart | H04L 67/1097 |
| | | | 726/6 |
| 2015/0344233 A1 * | 12/2015 | Kleinikkink | G05B 19/4185 |
| | | | 700/230 |
| 2018/0314441 A1 * | 11/2018 | Suryanarayana | G06F 3/0683 |
| 2020/0305101 A1 * | 9/2020 | Gage | H04W 76/11 |
| 2020/0412669 A1 * | 12/2020 | Schubert | H04L 45/44 |
| 2021/0051217 A1 * | 2/2021 | Rahardjo | H04L 9/0822 |
| 2021/0226846 A1 * | 7/2021 | Ballard | H04L 41/0843 |
| 2022/0100524 A1 * | 3/2022 | Gupta | H04L 41/0853 |
| 2023/0070609 A1 * | 3/2023 | Nagarajan | H04L 12/2807 |
| 2023/0145749 A1 * | 5/2023 | Li | H04L 12/10 |
| | | | 700/19 |
| 2023/0348201 A1 * | 11/2023 | Combs | B65G 23/08 |
| 2023/0382651 A1 * | 11/2023 | Greyson | B65G 13/06 |
| 2023/0382653 A1 * | 11/2023 | Greyson | B65G 13/06 |

OTHER PUBLICATIONS

PCT, Intl. App. No. PCT/US2021/071941 International Search Report, 3 pages, Feb. 10, 2022.
PCT, Intl. App. No. PCT/US2021/071941 Written Opinion of the International Searching Authority, 6 pages, Feb. 10, 2022.
Itoh Denki, IB-E03B, IB-E04F, and Itoh Configurator E/IP Software, Operating Instructions. Retrieved from the Internet: https://itohdenki.com/wp-content/uploads/IB-E-Manual.pdf, 87 pages, Aug. 1, 2014.

* cited by examiner

CONVEYOR CONTROLLER WITH SIDEBAND COMMUNICATION SYSTEM

CROSS REFERENCE TO RELATED APPLICATIONS

This application is a continuation of International Patent Application Number PCT/US2021/071941, filed Oct. 20, 2021, which is hereby incorporated by reference. International Patent Application Number PCT/US2021/071941, filed Oct. 20, 2021, claims the benefit of U.S. Patent Application No. 63/198,471, filed Oct. 21, 2020, which are hereby incorporated by reference.

BACKGROUND

Conveyors are used in a wide variety of environments such as in manufacturing and warehouse environments. Maintenance and upkeep of conveyor systems is always a concern. For traditional conveyor controller systems, when a controller card fails and/or needs to be replaced, a technician has to manually program the replacement card by for example setting specific dipswitches on the card. This can be a time consuming and laborious process.

Thus, there is a need for improvement in this field.

SUMMARY

A unique controller card has been developed for use in conveyor systems. The controller card includes support for both 24V and 48V rollers without any change in the settings and/or configuration of the card. Similarly, the controller card further supports both older style alternating current (AC) systems, where a solenoid engages or disengages the conveyor from an AC motor used to power the conveyor, and newer direct current (DC) systems without requiring additional modifications. Some general components of the controller card include a sideband communication system, a data analytic system, and a roller detection system.

A unique sideband communication system has been developed for the conveyor controller cards. Electronic control units (ECUs) or nodes in the form of the controller cards control the operation of various sections of conveyors as well as communicate information about the conveyors and items transported by the conveyors. Typically, but not always, each card is assigned to control and monitor the operation of one or more sections of conveyors. In one form, the cards of adjacent conveyor sections are daisy chained together through a wired connection so as to facilitate communication with one another as well as with other systems like a programmable logic controller (PLC). The cards in one variation are connected together through RJ45 type Ethernet cables. In other examples, the cards can be operatively connected through wireless and/or wired type connections. Together, the cards form a controller area network (CAN). In addition to the standard CAN communication protocol, the controller cards further communicate amongst themselves using a sideband communication protocol that is outside the realm of the standard CAN communication protocol. The sideband communication protocol allows the controller cards to communicate with each other without interfering with normal network communications which in turn provides additional capabilities.

The sideband communication system further allows the cards to automatically self-identify such as during initial installation or maintenance. The status or identity of the card can be determined in a number of ways. For example, if the card does not sense a connection at an upstream Ethernet port of the card where the Ethernet cable for an upstream card is normally connected, the card can self-identify as being the first card in the daisy chain. The first card in other examples can self-identify when a specific sensor, such as a wake-up photo eye, is connected to the card. Once the first card has been identified, the remaining downstream cards are able to self-identify in a sequential or cascading fashion from the first card. For example, the second card in one form receives a signal, such as in the form of an address, identifier, and/or command, through the sideband protocol from an upstream card that the upstream card has been identified as being the first card. In response to receiving the signal, the immediate downstream card self-identifies as the second card, and using the sideband communication protocol, the newly self-identified second card communicates with the downstream card so that the third card can self-address or identify in a similar fashion. The last card in the line can self-identify as being the last card in the line in several ways. For instance, the last card can monitor the connection status of a downstream communication port of the card and/or monitor signals from other connected devices like sensors and/or motors.

During installation or maintenance of multiple cards, programming or setting the operational parameters for the individual cards can be a laborious process. The sideband communication system is configured to facilitate this programming of multiple cards at or nearly at the same time by propagating the settings of one card to the other cards. In one aspect, the sideband communication system allows for a user interface (UI) to propagate operating parameters or settings to all of the cards through the sideband communication protocol almost instantaneously, or in some cases, in a sequential manner. In one form, the UI includes a series of buttons and light emitting diodes (LEDs), and in other forms, the UI includes a touchscreen or other types of UIs. In one example, a user selects a parameter and holds down a button on the selection for a few seconds before a selection window asks if the user wants to propagate the parameters to all connected cards. Via the sideband communication protocol, the controller card transmits over the CAN the parameters to the other cards without having to program each separately.

The sideband communication system further allows cards to detect failures in neighboring cards. For example, when communication in a neighboring card is sporadic or even nonexistent, the card in one variation sends a notification to the appropriate equipment (e.g., a PLC, computer, etc.) and/or personnel of the potential card failure. In other variations, the card monitors signals and operating conditions of neighboring cards to determine their operational status. For instance, when an item is transferred from an upstream conveyor section controlled by an upstream card to a downstream conveyor section controlled by a downstream card and the downstream card does not signal receipt of the item back to the upstream card, either on a continuous or intermittent basis, the upstream card sends a notification of potential failure of the downstream card to the appropriate equipment and/or personnel.

In earlier conveyor controller systems, when a controller card failed and/or needed to be replaced, a technician had to manually program the replacement card by for example setting specific dipswitches on the card. This can be a time consuming and laborious process. The sideband communication system facilitates an automatic recovery mode or buddy capability that allows cards to be readily replaced in case of card failure or system maintenance With this recovery capability, each card has memory for storing the settings of cards located immediately upstream and downstream from the card. The configuration information from the upstream and downstream cards in one example is communicated using the sideband communication protocol. When a failed card is replaced with a new card, the upstream and/or downstream card automatically transfers the previous configuration settings to the new card using the sideband channel, thus saving time, effort, and money during card replacement. With each card storing the settings for both the upstream and downstream cards, at least two adjacent control cards can be replaced and automatically programed by the upstream and downstream cards bookending the two adjacent cards.

The sideband communication system further allows scanner-less, zone-to-zone tracking of packages or other items along various conveyor sections or zones. The system in one form is configured to track packages in the conveyor zones by assigning virtual tracking numbers. Alternatively or additionally, the system receives a unique identifier for the package from a barcode and/or radio frequency identification (RFID) scanner located along an upstream conveyor zone. Once identified, the package can be tracked along various conveyor zones without the need for rescanning because the controller cards through the sideband communication protocol communicate the package identifiers when the packages are moved along and/or transferred from the various conveyor zones.

For instance, when a package is received on a conveyor section controlled by a card, the upstream card sends to the current conveyor section card the identifier for the package, and the current conveyor card stores the package identifier in memory. Based on the conveyor speed and information from sensors along the conveyor section as well as other factors, the card determines and tracks the location of the package on the conveyor section. Through the CAN, the card in one form transmits the package identifier (either virtual or actual identifier) as well as other information to a warehouse management system (WMS) or other system so that the package location is tracked throughout a facility. Before, during, or after the tracked package leaves the zone controlled by the card, the card transmits the package identifier to the downstream card so that the package can then be tracked along the downstream conveyor zone.

The system and techniques as described and illustrated herein concern a number of unique and inventive aspects. Some, but by no means all, of these unique aspects are summarized below.

Aspect 1 generally concerns a conveyor system.

Aspect 2 generally concerns the system of any previous aspect in which controller cards are dedicated to control individual conveyor zones.

Aspect 3 generally concerns the system of any previous aspect in which the controller cards are operatively connected to one another to form a network.

Aspect 4 generally concerns the system of any previous aspect in which the controller cards are configured to communicate with each other using a sideband communication protocol that is different from a standard communication protocol for the network.

Aspect 5 generally concerns the system of any previous aspect in which the controller cards are operatively connected via one or more communication cables.

Aspect 6 generally concerns the system of any previous aspect in which the communication cable includes a main communication channel and a sideband communication channel.

Aspect 7 generally concerns the system of any previous aspect in which the sideband communication channel is configured to communicate data using a RJ485 serial protocol.

Aspect 8 generally concerns the system of any previous aspect in which the controller cards each have an upstream port and a downstream port configured to respectively communicate with upstream and downstream controller cards.

Aspect 9 generally concerns the system of any previous aspect in which the controller cards are configured to automatically self-identify.

Aspect 10 generally concerns the system of any previous aspect in which the controller cards are configured to self-identify in a sequential manner based on a card identifier from an upstream controller card.

Aspect 11 generally concerns the system of any previous aspect in which the controller cards are configured to self-identify based on a port connection status.

Aspect 12 generally concerns the system of any previous aspect in which the controller cards are configured to self-identify based on a type of sensor connected to the controller cards.

Aspect 13 generally concerns the system of any previous aspect in which the sensor includes a wake-up photoeye.

Aspect 14 generally concerns the system of any previous aspect in which the controller cards have a user interface configured to propagate card settings to the other controller cards.

Aspect 15 generally concerns the system of any previous aspect in which the controller cards are configured to automatically detect failures of neighboring controller cards.

Aspect 16 generally concerns the system of any previous aspect in which the controller cards are configured to communicate card failures on behalf of the failed neighboring controller card.

Aspect 17 generally concerns the system of any previous aspect in which the controller cards are configured to detect card failures based on communication status of the neighboring controller card.

Aspect 18 generally concerns the system of any previous aspect in which the controller cards are configured to detect card failures based on veracity of operational conditions communicated by the neighboring controller cards.

Aspect 19 generally concerns the system of any previous aspect in which the controller cards are configured to automatically program neighboring replacement cards with settings from the replaced controller card.

Aspect 20 generally concerns the system of any previous aspect in which the controller cards have memory configured to stores settings from neighboring upstream and downstream controller cards.

Aspect 21 generally concerns the system of any previous aspect in which the conveyor system is configured to perform scanner-less zone-to-zone tracking of items transported via the conveyor system.

Aspect 22 generally concerns the system of any previous aspect in which the controller cards are configured to communicate identifiers for the items to a downstream controller card as the items transition to a downstream conveyor zone controlled by the downstream controller.

Aspect 23 generally concerns the system of any previous aspect in which the identifiers are virtual identifiers created by the controller cards.

Aspect 24 generally concerns the system of any previous aspect in which the controller cards are configured to communicate zone-to-zone tracking information to a warehouse management system (WMS).

Aspect 25 generally concerns the system of any previous aspect in which the controller cards include one or more inputs and/or outputs.

Aspect 26 generally concerns the system of any previous aspect in which the programmable logic controller (PLC) is configured to reconfigure the inputs and/or outputs of the controller cards.

Aspect 27 generally concerns the system of any previous aspect in which the PLC is adapted to reconfigure at least one of the controller cards over the network.

Aspect 28 generally concerns the system of any previous aspect in which the controller cards are configured to send a notification over the network to the PLC.

Aspect 29 generally concerns the system of any previous aspect in which the computer configured to remotely flash the controller cards using a window based interface.

Aspect 30 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
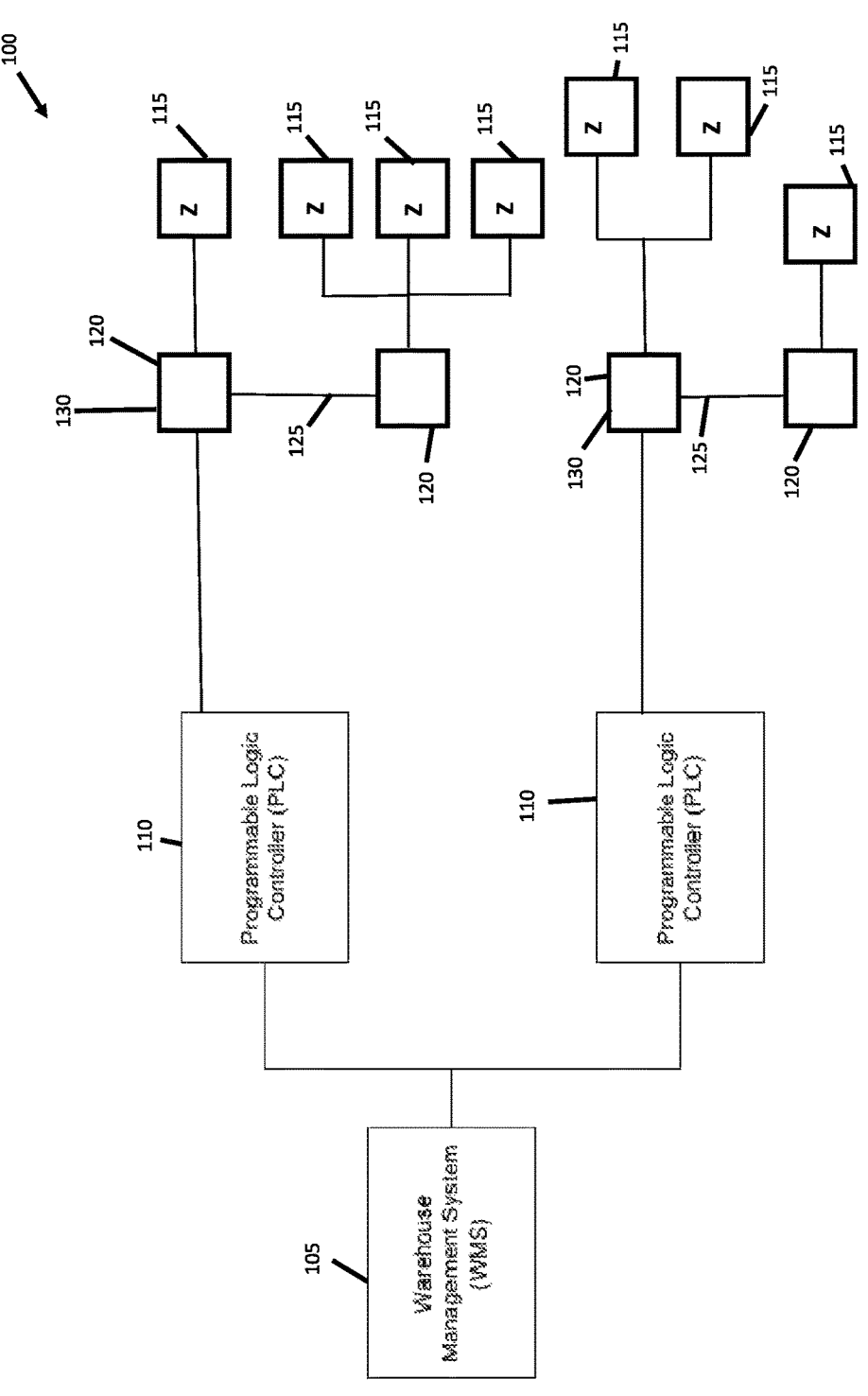
FIG. 1 is a block diagram of a conveyor system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

One example of a conveyor system 100 that addresses the above-mentioned issues as well as other issues is illustrated in FIG. 1. As shown, the conveyor system 100 includes a warehouse management system (WMS) 105 for monitoring and/or controlling the flow of packages or other items within a facility such as a warehouse or manufacturing plant. The conveyor system 100 further includes one or more programmable logic controllers (PLCs) 110 operatively connected to the warehouse management system 105 such as via a wired and/or wireless connection. In other embodiments, the programmable logic controllers 110 may be replaced with a robot management system. The robot management system is constructed to take over operation of the conveyor system 100 from the programmable logic controllers 110. Each programmable logic controller 110 is configured to monitor and/or control the operation of conveyor equipment within one or more conveyor zones 115. In the illustrated example, the conveyor zones 115 each have a controller card 120 configured to control and/or monitor the operation of conveyor equipment within their respective conveyor zones 115.

The controller cards 120 are daisy-chained together through a physical, wired connection in one example. As can be seen in some configurations, each of the controller cards 120 that are daisy-chained together are able to control one or more conveyor zones 115. In one example, each controller card 120 controls a single conveyor zone 115, but in other examples, a single controller card 120 may control two or more conveyor zones 115. As can seen in the illustrated example, a combination approach is used where some of the controller cards 120 control a single conveyor zone 115 and other controller cards 120 control multiple conveyor zones 115. The controller cards 120 in other configurations shown in FIG. 1 are daisy-chained across multiple conveyor zones 115. In the illustrated example, the controller cards 120 are operatively connected in a serial manner via one or more communication cables 125. In one variation, the communication cable 125 is in the form of an Ethernet type cable. As should be appreciated, an Ethernet cable commonly (but not always) is in the form of a cable containing twisted pairs of wires, such as a category 5 or 6 cable, with 8 position 8 contact (8P8C) modular connectors usually at both ends that are commonly referred to as registered jack 45 (RJ45) connectors. The RJ45 connectors are typically, but not always, plugged into a corresponding RJ45 plug to facilitate communication between the connected devices.

Together, the controller cards 120 form a controller area network (CAN) or local area network (LAN). In addition to the standard CAN communication protocol, the controller cards 120 further communicate amongst themselves using a sideband communication protocol that is outside the realm of the standard CAN communication protocol. The sideband communication protocol allows the controller cards 120 to communicate with each other without interfering with normal network communications which in turn provides additional capabilities.

In some types of communication standards, the full capacity of the physical communication channel is not used. For example, with the 10BASE-T or 100BASE-TX protocols, an Ethernet cable with the TS568A or T568B connector wiring assignments, only connector pins 1, 2, 3, and 6 (e.g., striped white/green, solid green, white/orange, and solid orange wires) of the RJ45 connector are generally used for communications. On the other hand, pins 4 and 5 (i.e., solid blue and striped white/blue wires) as well as pins 7 and 8 (striped white/brown and solid brown wires) are generally not used to communicate data.

The controller cards 120 use this untapped or unused channel capacity in the Ethernet cable to form a sideband communication channel or network that allows the controller cards 120 to communicate with one another along the chain of controller cards 120. In one version, one or more of the unused twisted pair wires or pins (e.g., pins 4 and 5) within an Ethernet cable form a sideband communication channel that facilitates sideband communication between the controller cards 120 using a serial communication protocol such as via universal asynchronous receiver-transmitter (UART) hardware. In one particular example, the communication cables 125 are in the form of Ethernet cables in which pins 4 and 5 of the RJ45 connectors are used to communicate using the RS-485 standard for robust serial communications. In other variations, pins 7 and 8 are alternatively or additionally used for the sideband communication between the controller cards 120 via the RS-485 standard. The RS-485 communication standard is especially helpful for sideband communications in the conveyor system 100 because the conveyor system 100 is typically used in electrically noisy environments like warehouses and manufacturing plants. The communications on this sideband communication channel do not interfere with the normal Ethernet communications between the conveyor zones 115 and controller cards 120 on the other wires within the communication cable 125 (e.g., RJ45 connector pins 1, 2, 3, and 6).

It should be recognized that this sideband communication technique can be used with other types of communication cables 125 so long as channel space is available for sideband communications. For example, while 8P8C modular connectors and paired wires were described above, it should be recognized that the sideband communication technique can be used in different designs that have more or less wires/pins. For instance, the sideband can be used in communication cables 125 that have 6 pin 6 connector (6P6C) type modular connectors (e.g., RJ11, RJ14, or RJ25 connectors) or 10 pin 10 connector (10P10C) type modular connectors (e.g., RJ50 connectors). Other examples of the communication cables 125 do not require twisted or untwisted wire pairs. For instance, the communication cable 125 can include a coaxial cable or fiber optic cable, and the unused communication channel space on the coaxial or fiber optic cable is used for sideband communications between the controller cards 120. In other variations, a wireless communication network (e.g., Wi-Fi) is used for communications between the controller cards 120, and some or all of the unused spectrum or channels is used to form a sideband communication network between the controller card 120.

Again, as can be seen in FIG. 1, the controller cards 120 are daisy-chained together with the communication cables 125. At the end of this chain, proximal to the programmable logic controller 110, the controller card 120 at this position is designated the chain master 130 (or gateway) through which communications to and from the programmable logic controller 110 and the controller cards 120 within the conveyor zone 115 are funneled.

The programmable logic controllers 110 through the CAN are further adapted to remotely configure or reconfigure the controller card 120. For instance, each controller card 120 in one version has inputs and outputs that are reconfigurable. The programmable logic controller 110 in one form is able to reprogram or override the default settings of the inputs and/or outputs of the controller card 120. The programmable logic controllers 110 in one variation reprogram the controller card 120 to send a notification over the CAN to the programmable logic controllers 110 when one or more conditions occur. For example, the controller card 120 can be programmed to send a notification when a conveyor zone 115 is empty and/or when an attached photoeye senses the presence or absence of an object. The programmable logic controllers 110 in one form treat the input/output of the controller card 120 as a gate. In other words, the programmable logic controller 110 is able to reconfigure the controller card 120 so that the card is able to act as a remote sensor without the need for installing a separate output extender.

Figure 2:
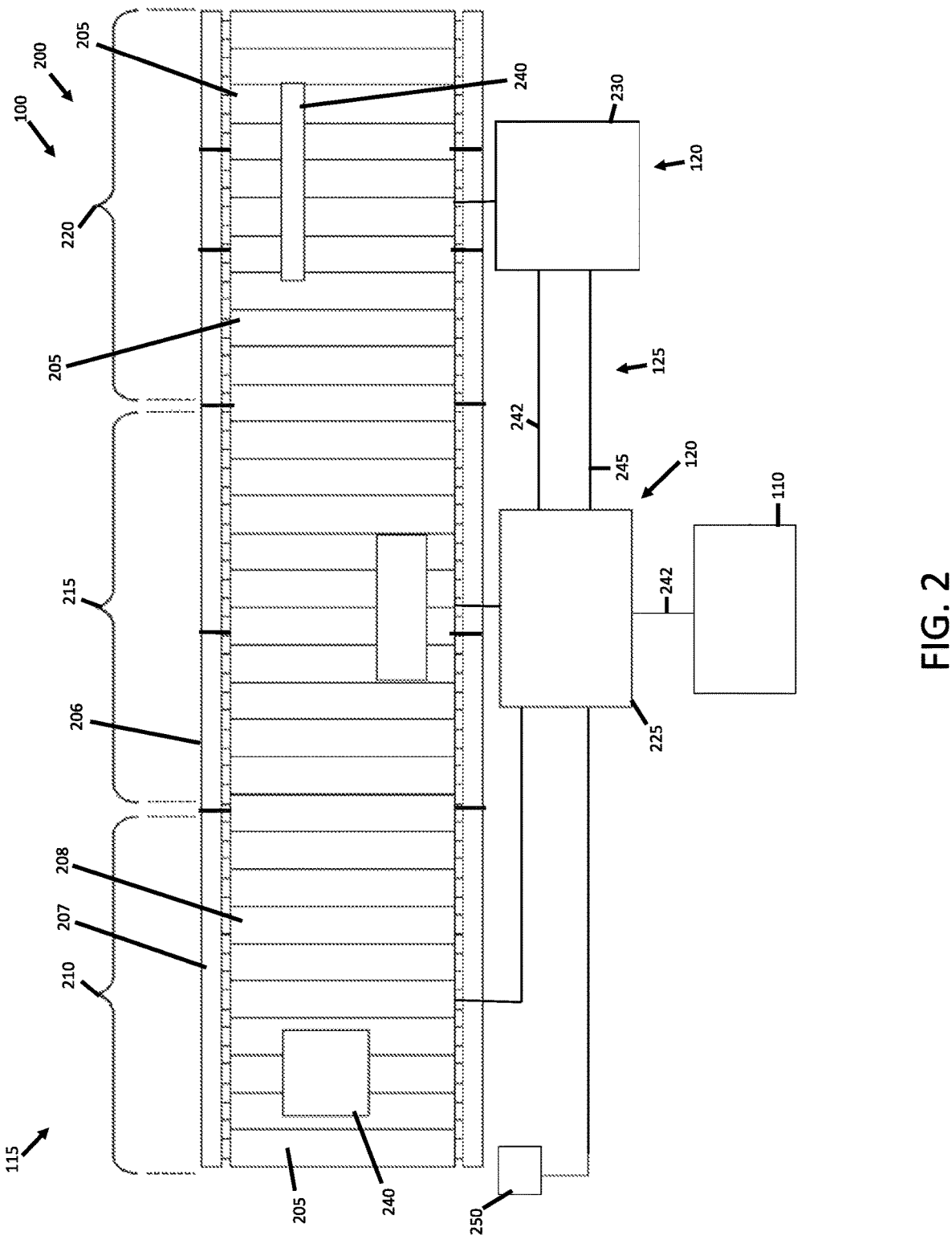
FIG. 2 is a block diagram of a conveyor system.

One example of a conveyor system 200 that is used with the conveyor system 100 is depicted in FIG. 2. As shown, the conveyor system 200 includes one or more conveyors 205 organized into various conveyor zones 115. In the illustrated example, the conveyor 205 is a roller type conveyor, but it should be recognized that the conveyor 205 can include other types of conveyors like belt conveyors and slat conveyors. As depicted, each conveyor 205 includes a frame 206 with opposing rails 207 that support rollers 208 and are configured to convey or otherwise transport various packages or other items. The rollers 208 of the conveyor 205 for instance can include powered rollers, unpowered rollers, or any combination thereof.

The conveyors 205 are organized into the various conveyor zones 115. In the depicted example, the conveyor zones 115 include a first zone 210, a second zone 215, and a third zone 220, but it should be recognized that other configurations of the conveyor system 100 can include more or less conveyor zones 115. Each conveyor zone 115 can include one or more of the conveyors 205. Some or all of the conveyor zones 115 can include a single conveyor 205 in certain configurations, and the conveyor zones 115 in other configurations can have multiple conveyors 205.

As noted above with respect to FIG. 1, the controller cards 120 in the conveyor zones 115 are daisy-chained together via the individual communication cables 125. The daisy-chained controller cards 120 can control a single conveyor zone 115 or can control multiple conveyor zones 115. The controller card 120 in the chain connected to the programmable logic controller 110 is once more the chain master 130 for the chain of controller cards 120. The chain master 130 typically, but not always, is connected to the programmable logic controller 110 using the same type of communication cable 125 connecting the controller cards 120 together. For instance, the chain master 130 in one form is connected to the programmable logic controller 110 via an Ethernet cable. In one variation, the sideband communication along the communication cable 125 is limited to communications between the controller cards 120, and the controller cards 120 do not communicate with the programmable logic controller 110 via the sideband communication link. In other variations, the controller cards 120 can communicate with the programmable logic controller 110 via a sideband communication link.

The controller cards 120 are operatively connected to the conveyors 205, sensors, equipment, and/or other devices within the corresponding conveyor zone 115. In turn, the controller cards 120 are able to monitor the operation of and control the conveyors 205 within the particular conveyor zone 115. For instance, the conveyor zone 115 can be used to instruct one or more rollers 208 within the conveyor zone 115 to move or stop. For explanation purposes, the controller card 120 controlling a particular conveyor zone 115 may be identified by the zone number. For example, the controller card 120 controlling the first zone 210 may be referred to as a first controller card 225, and the controller card 120 controlling the third zone 220 may be referred to as a third controller card 230. With the controller cards 120, the warehouse management system 105 and/or programmable logic controller 110 is able to monitor and control movement of one or more packages 240 or other items on the conveyors 205 in the various conveyor zones 115.

As mentioned previously, the controller cards 120 are typically connected via the communication cables 125, and the communication cable 125 has a main/primary CAN communication link or main communication channel 242 and a sideband communication channel 245. The sideband communication channel 245 enables the controller cards 120 to exchange information relating to status, package location, and/or other pertinent data without interrupting communications along the main communication channel 242. In one example, the communication cables 125 are in the form of Ethernet cables using the TS568A (or T568B) connector wiring (pin) assignments. In this example, the main communication channel 242 uses the 10BASE-T or 100BASE-TX protocols such that connector pins 1, 2, 3, and 6 of the RJ45 connector along with the corresponding wires form the main communication channel 242. The warehouse management system 105 and/or programmable logic controller 110 communicate with the controller cards 120 using the 10BASE-T or 100BASE-TX protocols along this primary, main communication channel 242. In this example, pins 4 and 5 of the RJ45 connector and the corresponding wires in the communication cable 125 form the sideband communication channel 245 along which the controller cards 120 are able to communicate with each other using the RS485 serial communication protocol.

Once more, it should be recognized that other types of communication protocol can form the main communication channel 242 and sideband communication channel 245. For instance, when a wireless communication network is used for communications between the controller cards 120, the carrier can be used for the main communication channel 242, and the upper sideband (USB) and/or lower sideband (LSB) can be used for the sideband communication channel 245.

Other types of devices or sensors besides the conveyor 205 can be operatively connected to the controller cards 120. In the illustrated example of FIG. 2, the conveyor system 200 has a photoeye 250 that is operatively connected to one of the controller cards 120. The photoeye 250 detects the presence of the package 240 in a particular conveyor zone 115. The photoeye 250 then shares the package 240 information with the controller card 120 within the proper conveyor zone 115. To track the progress of the package 240, the first controller card 225, which controls the first zone 210 and the second zone 215, transmits a package identifier via the sideband communication channel 245 to the third controller card 230 as the package 240 moves from the second zone 215 to the third zone 220. This process continues downstream until reaching the end of the conveyor system 200.

Figure 3:
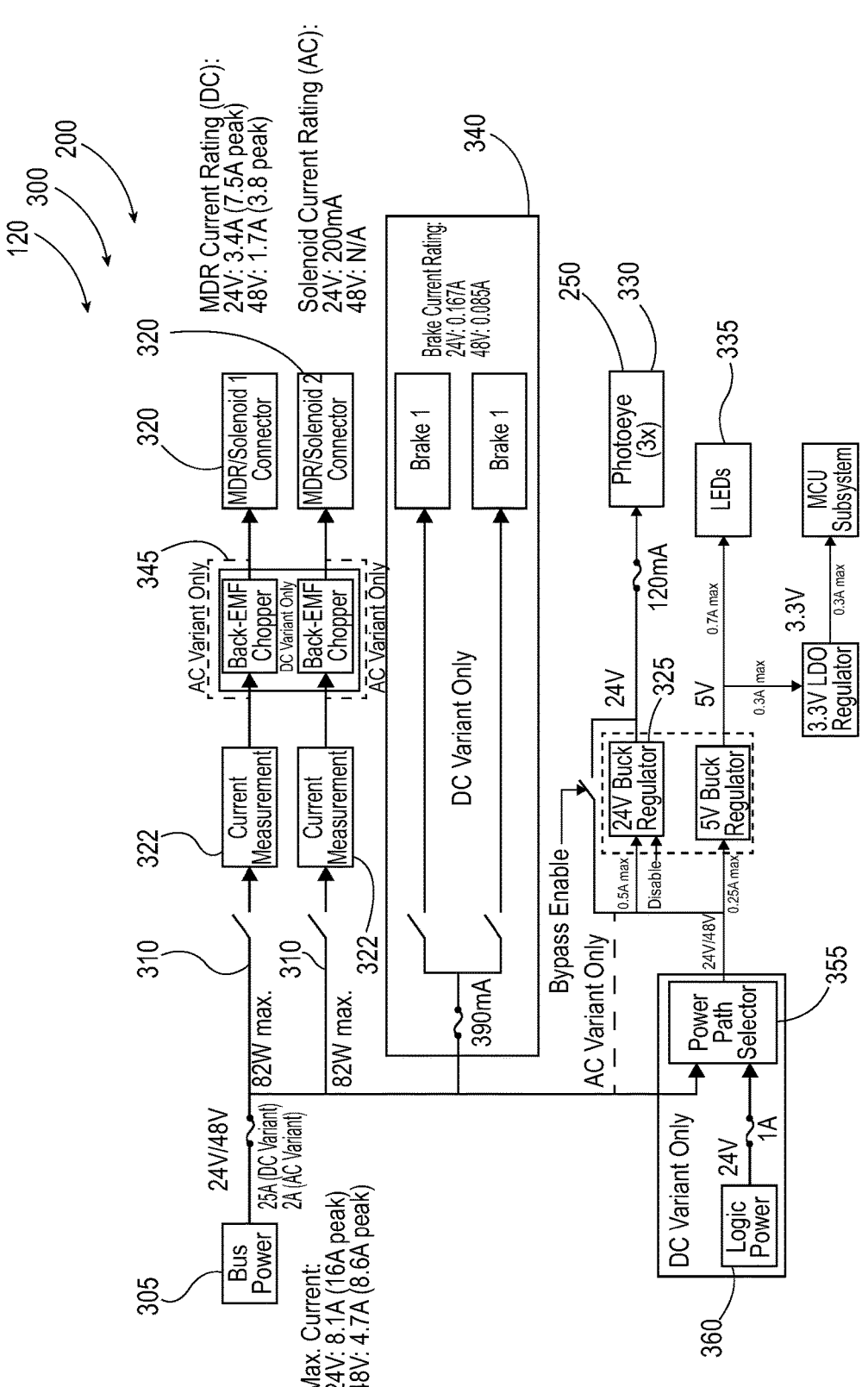
FIG. 3 is a block diagram of a power system.

As shown in FIG. 3, each controller card 120 of the conveyor system 200 includes a power system 300 for supplying and controlling power to the controller card 120 as well as other equipment such as the conveyor 205 and the rollers 208. The power system 300 includes bus power 305. In some examples, the bus power 305 is 24 volts (V). However, in other examples the bus power 305 is 48V. The bus power 305 flows through a series of parallel paths where power flow is controlled via a number of switches 310. The switches 310 typically function in an open/closed manner where an open switch does not allow power flow and a closed switch does allow power flow.

In an alternating current (AC) system the power continues to flow into a conveyor power connector 320 that for example supplies power to an electrically powered component of the conveyor 205. For instance, the conveyor power connector 320 may power a motorized drive roller (MDR), a solenoid, and/or another device requiring AC power to operate. The AC power may also flow to one or more photoeyes 250. Current drawn to power the components connected to the conveyor power connector 320 is measured via one or more current sensors 322.

In a direct current (DC) system the power is changed from fixed DC to variable DC power. Typically, this is done via a chopper 345 integrated into the system upstream of the conveyor power connector 320. A brake 340 is also included in the DC system. The DC system may also include logic power 350 configured to power the control logic of the conveyor system 200. The logic power 350 may also run into a power path selector 355, which sends the DC power through one or more regulators 325. From the regulators 325 power may flow into one or more photoeyes 330 and/or one or more light emitting diodes 335.

Figure 4:
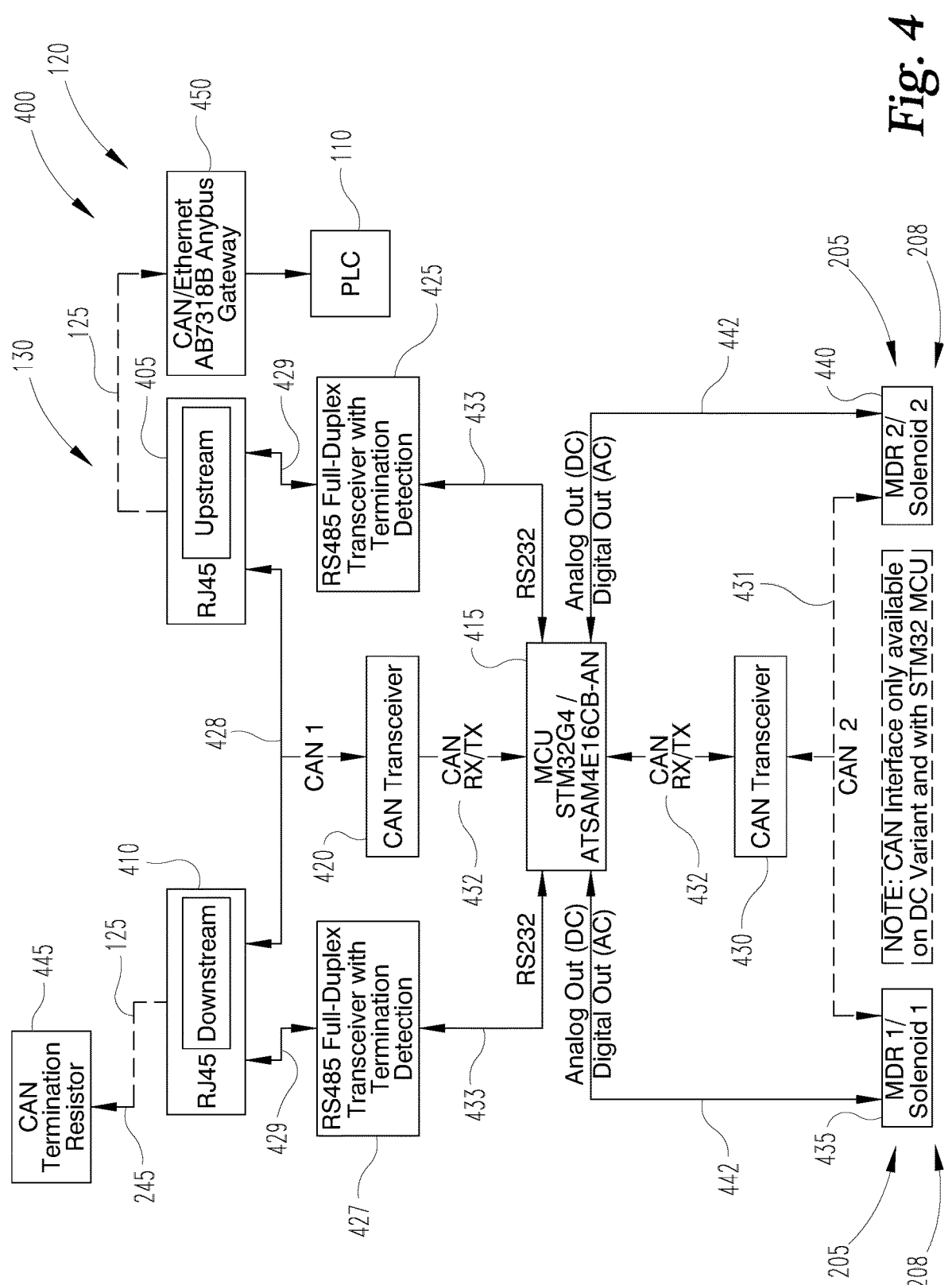
FIG. 4 is a block diagram of a communication system.

Turning to FIG. 4, an example of a communication system 400 for the controller card 120 is shown. The communication system 400 includes an upstream port 405 and a downstream port 410. Generally, the upstream port 405 of a controller card 120 is connected to the downstream port 410 of a preceding controller card 120 or the programmable logic controller 110. Likewise, the downstream port 410 is connected to the upstream port 405 of following controller cards 120 or to generally nothing. In one example, the upstream port 405 and downstream port 410 are in the form of RJ45 type sockets configured to receive corresponding connector plugs of the communication cable 125 in the form of an Ethernet cable. The connections at the upstream port 405 and downstream port 410 can be configured differently in further variations. In still yet other examples, the connections may be wireless.

The upstream port 405 and downstream port 410 communicate with a motor control unit 415 via a first network carrier transceiver 420 along with an upstream sideband transceiver 425 and a downstream sideband transceiver 427. In the illustrated example, the first network carrier transceiver 420 is in the form of a controller area network (CAN) transceiver that transmits and receives communications from the programmable logic controllers 110 and other controller cards 120 along the main communication channel 242 of the communication cable 125. As shown, the first network carrier transceiver 420 is operatively connected to the upstream port 405 and downstream port 410 via the first carrier network connection 428. The upstream sideband transceiver 425 and downstream sideband transceiver 427 are operatively connected to the upstream port 405 and downstream port 410, respectively, via one or more sideband connections 429. The upstream sideband transceiver 425 receives and transmits sideband communications from controller cards 120 located upstream from the current controller card 120 via the upstream port 405, and the downstream sideband transceiver 427 receives and transmits sideband communications from controller cards 120 located downstream from the current controller card 120. As should be appreciated, the sideband communications via the upstream sideband transceiver 425 and downstream sideband transceiver 427 can generally occur without interfering with normal communications via the first network carrier transceiver 420.

Returning to the previously described Ethernet example where the communication cables 125 are in the form of Ethernet cables using the TS568A (or T568B) connector pin assignments, the main communication channel 242 uses the 10BASE-T or 100BASE-TX protocols such that connector pins 1, 2, 3, and 6 of the RJ45 connector along with the corresponding wires form the main communication channel 242. Via pins 1, 2, 3, and 6 of the upstream port 405 and/or the downstream port 410, the first network carrier transceiver 420 communicates with the programmable logic controller 110 and/or other controller cards 120 using the Ethernet protocols along the primary, main communication channel 242 of the communication cable 125. In this same example, pins 4 and 5 of the RJ45 connector and the corresponding wires in the communication cable 125 form the sideband communication channel 245 along which the controller cards 120 are able to communicate with each other using the RS485 serial communication protocol.

As depicted, the motor control unit 415 is operatively connected to the first network carrier transceiver 420, upstream sideband transceiver 425, and downstream sideband transceiver 427 so as to be able to communicate along the main communication channels 242 and sideband communication channels 245 of the communication cables 125. The motor control unit 415 is further operatively connected to other components in the corresponding conveyor zone 115. For instance, the motor control unit 415 is operatively connected to a second network carrier transceiver 430 that communicates with components of the conveyor zone 115 (e.g., the conveyor 205, photoeye 250, etc.) through a conveyor or second carrier network 431. Both the first network carrier transceiver 420 and second network carrier transceiver 430 are operatively connected to the motor control unit 415 through motor control unit carrier links 432. The upstream sideband transceiver 425 and downstream sideband transceiver 427 are operatively connected to the motor control unit 415 via one or more motor control unit sideband links 433.

With continued reference to FIG. 4, the motor control unit 415 via the second carrier network 431 is operatively connected to a first electrical device 435 and a second electrical device 440. Alternatively or additionally, the motor control unit 415 is directly connected to the first electrical device 435 and second electrical device 440 via one or more direct conveyor connections 442. The direct conveyor connections 442 can include digital or analog type connections. The first electrical device 435 and second electrical device 440 can include rollers 208 in the form of motorized drive rollers (MDRs), solenoids, or other equipment and/or sensors (e.g., photoeyes 250) associated with the conveyors 205. Through the second network carrier transceiver 430 and/or direct conveyor connection 442, the motor control unit 415 is able to monitor and control the rollers 208. For instance, the motor control unit sideband link 433 is able to power and control the speed and operation of MDRs in the conveyors 205 as packages 240 are transported on the conveyors 205. Information from the conveyors 205 as well as sensors associated with the conveyors 205 is processed via the motor control unit 415 and communicated to the programmable logic controllers 110 and/or controller cards 120 via the main communication channels 242 and/or sideband communication channels 245. For instance, the motor control unit 415 can be used to track packages 240 as the packages 240 travel on and between various conveyor zones 115.

Through the upstream sideband transceiver 425, the controller card 120 is able to determine the relative chain location of the controller card 120 along a given daisy-chained set of controller cards 120. The sideband communication capability facilitates in determining whether the controller card 120 is the first controller card 120 in the chain, the last controller card 120 in the chain, or somewhere in the middle.

Looking at FIG. 4, a termination resistor 445 in one example is connected to the downstream port 410 when the controller card 120 is the last one in the chain. By measuring the resistance (or voltage) of the termination resistor 445 (or the sideband communication channel 245 at the downstream port 410), the motor control unit 415 of the controller card 120 is able to determine that the controller card 120 is the last one in the chain. For instance, the termination resistor 445 can have a high resistance which indicates that no downstream controller card 120 is connected to the downstream port 410. On the other hand, when the resistance is within a range that indicates a downstream controller card 120 is connected, then the controller card 120 determines the controller card 120 is not the last one. Alternatively or additionally, when nothing is connected to the sideband communication channel 245 at the downstream port 410 (i.e., open contact), the open signal or very high resistance signifies that no downstream controller card 120 is connected, and the current controller card 120 is the last one in the chain. Returning to the previous Ethernet example, when a high resistance or an open condition is detected at pins 5 and 6 of the RJ45 socket at the downstream port 410, the controller card 120 determines the controller card 120 is the last one in the chain. Alternatively or additionally, the downstream sideband transceiver 427 can broadcast a ping or request a response via the downstream port 410 on the sideband communication channel 245. If no response is received, the controller card 120 is the last one on the chain. Conversely, if a response is received, then the controller card 120 is not the last one in the chain.

In certain cases, the programmable logic controllers 110 of the controller card 120 are directly connected to the upstream port 405 via one of the communication cables 125. Sometimes however, as is shown in FIG. 4, the chain master 130 is indirectly connected to the programmable logic controller 110 through a CAN gateway 450. In either case, the controller card 120 can determine if the controller card 120 is the first one in the chain, or the chain master 130, by communicating via the upstream port 405. For instance, the first network carrier transceiver 420 of the controller card 120 can ping or request a response from the programmable logic controller 110 by communicating over the main communication channel 242 via the upstream port 405. If a response from the programmable logic controller 110 is received, the controller card 120 is the chain master 130. Conversely, when no response is received from the programmable logic controller 110, the controller card 120 is not the first one in the chain. Alternatively or additionally, the upstream sideband transceiver 425 can send a signal (or measure resistance like before) along the sideband communication channel 245 to determine whether another controller card 120 is located upstream. If the signal or measured resistance (or voltage) is indicative of no connection, the controller card 120 infers the controller card 120 is the chain master 130.

The controller card 120 is also configured to determine when the controller card 120 is not installed or not properly installed. For example, using the techniques described above, when the controller card 120 detects that the controller card 120 is not connected at the upstream port 405 and downstream port 410, then the controller card 120 is considered uninstalled or not connected.

Figure 5:
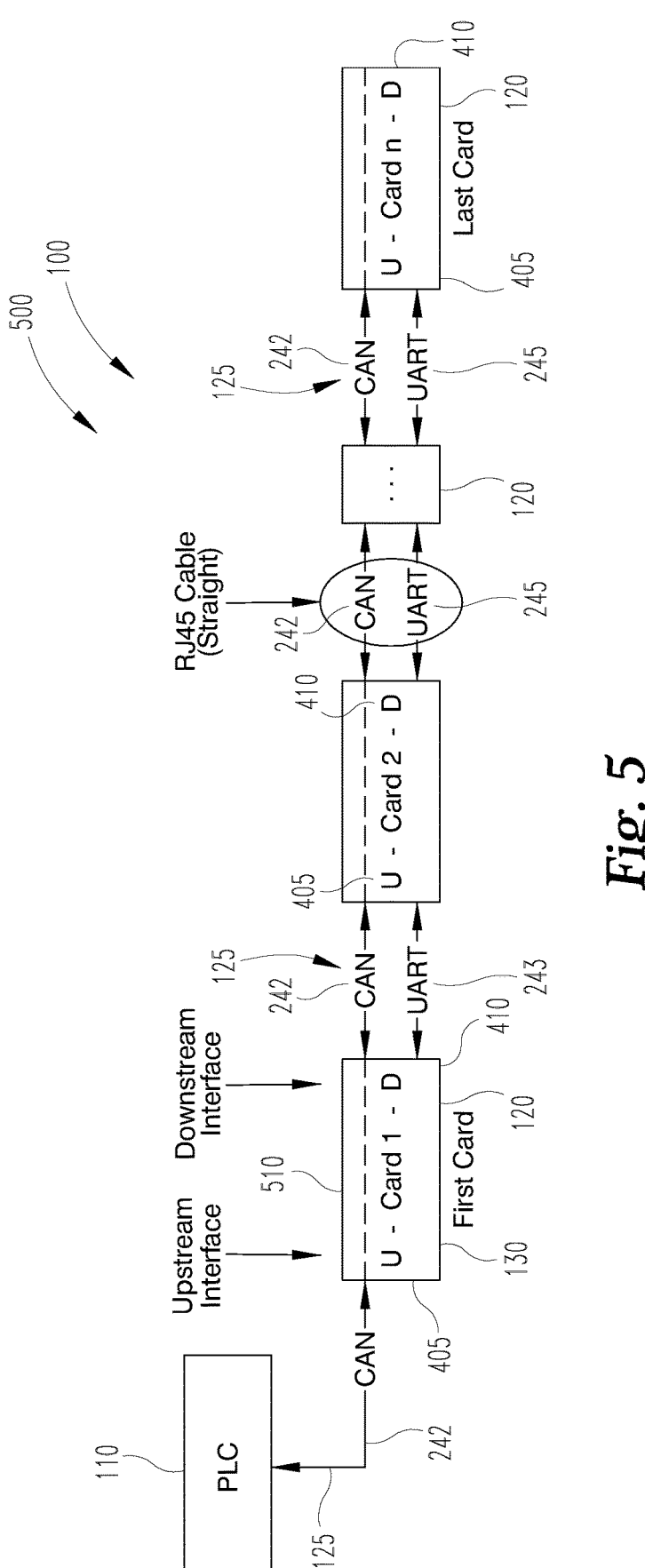
FIG. 5 is a block diagram of a sideband communication system.

One example of a sideband communication system 500 that can be incorporated into the conveyor system 100 is illustrated in FIG. 5. As mentioned previously, the controller card 120 communicates via the sideband communication system 500. The controller cards 120 include a first controller card 510 and a second controller card 520. The first controller card 510 and second controller card 520 are once more operatively connected via the communication cable 125. As noted before, the communication cable 125 includes the main communication channel 242 and the sideband communication channel 245. In the illustrated example, the main communication channel 242 facilitates communication via a controller area network (CAN) type protocol, and the sideband communication channel 245 facilitates communication using a universal asynchronous receiver-transmitter (UART) type protocol.

In this example, the first controller card 510 acts as the chain master 130. The programmable logic controller 110 is operatively connected to the upstream port 405 of the first controller card 510 via the communication cable 125. The first controller card 510 receives a command from the programmable logic controllers 110 via the main communication channel 242 of the communication cable 125. Through the communication cable 125, the downstream port 410 of the first controller card 510 is connected to the upstream port 405 of the second controller card 520. The first controller card 510 passes the command to the next (downstream) second controller card 520 through the communication cable 125. Subsequent downstream controller cards 120 are connected in a similar fashion and communicate in a similar fashion. In one form, the connection of the downstream port 410 of the first controller card 510 to the upstream port 405 of the second controller card 520 is via a RJ45 type ethernet cable. Once more, other types of connections can be used in other examples.

The sideband communication system 500 of the conveyor system 100 is configured to allow the controller cards 120 to automatically self-identify such as during initial installation, replacement, and/or general maintenance. The status or identity of the controller card 120 can be determined in a number of ways. As explained above, the controller card 120 can determine the relative location of the controller card 120 in the chain of controller cards 120 in several ways. Based on this determination of relative location, the controller card 120 can initiate the self-addressing or identification process. For example, if the controller card 120 does not sense a connection or signal on the sideband communication channel 245 at the upstream port 405 of the controller card 120 where the communication cable 125 for an upstream controller card 120 is normally connected, the controller card 120 can self-identify as being the first card in the daisy-chain (e.g., the chain master 130). In an alternative or additional variation, the chain master 130 or first controller card 510 self-identifies by detecting the programmable logic controllers 110 being directly connected to the upstream port 405 of the first controller card 510.

In one version, the chain master 130 self-identifies by self-assigning a specific address or other identifier (e.g., 1), and the remaining controller cards 120 in the chain can increment their addresses relative to the address of the chain master 130 (e.g., 2, 3, etc.). The chain master 130 in other examples can self-identify when a specific sensor, such as a wake-up photoeye 250, is connected to the card. Once the chain master 130 has been identified, the remaining downstream cards are again able to self-identify in a sequential or cascading fashion from the first card (e.g., 2, 3, 4, etc.). For example, the second controller card 520 in one form receives a signal, such as in the form of an address, identifier, and/or command, through the sideband communication channel 245 from the upstream, first controller card 510. In response to receiving the signal, the immediate downstream card self-identifies as the second controller card 520 (e.g., 2), and using the sideband communication channel 245 connected to the downstream port 410 of the second controller card 520, the newly self-identified second controller card 520 communicates with the next downstream controller card 120 so that the third card can self-address or identify in a similar fashion. This process of self-identifying continues in a similar fashion of the remaining controller cards 120 until the last controller card 120 is reached. Each time an address is assigned, the address and other pertinent information can be broadcasted to the other controller cards 120 in the link through the sideband communication network.

As explained above, the last controller card 120 can self-detect its relative position in the chain in several ways. For instance, the last controller card 120 can detect a high resistance or open connection on the sideband link pins in the downstream port 410. The last controller card 120 in the line can also self-identify as being the last controller card 120 in the line by monitoring signals from other connected devices like sensors and/or motors. Once the last controller card 120 is assigned an address, the last controller card 120 can communicate the completion of the process on the sideband communication network. It should be recognized that this technique of self-addressing the controller cards 120 reduces the risk of address errors as well as simplifies installation of new controller cards 120. Moreover, using the sideband communication network (i.e., the sideband communication channels 245) with this technique, reduces congestion on the carrier network or CAN as well as reduces communication errors.

Figure 6:
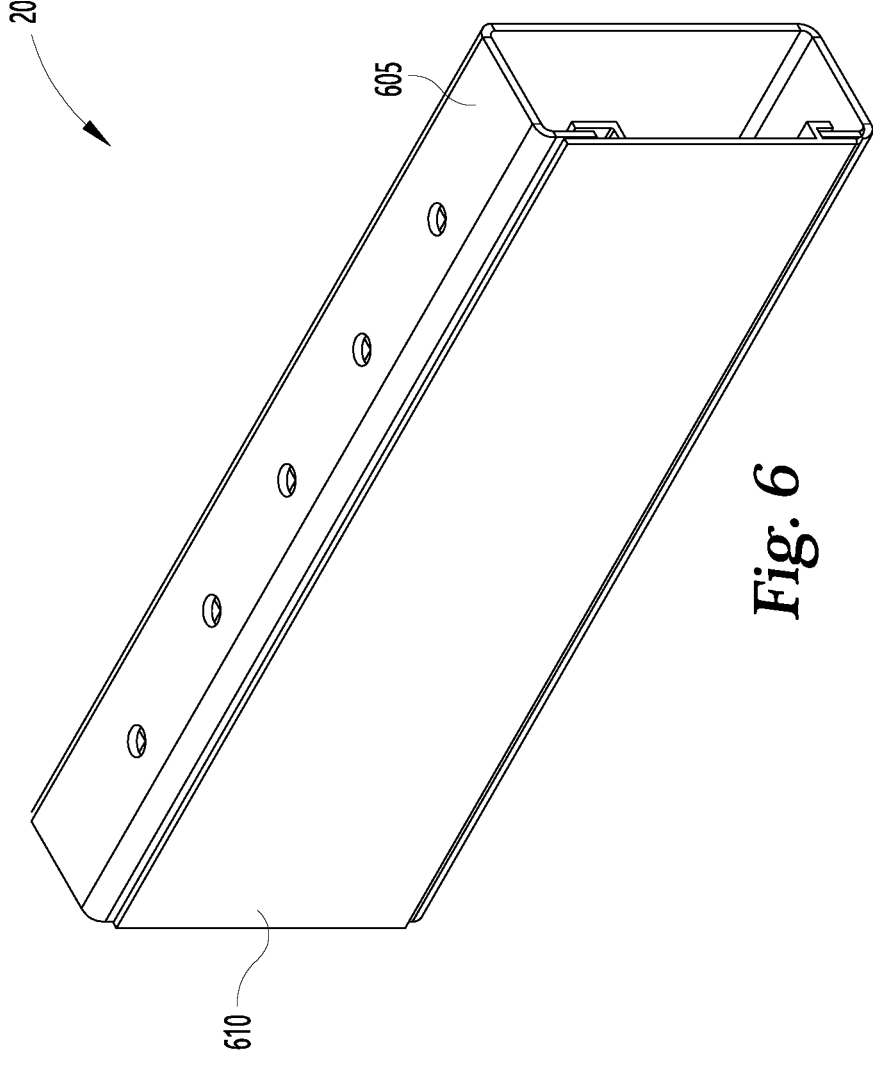
FIG. 6 is a perspective view of a controller card.
Figure 7:
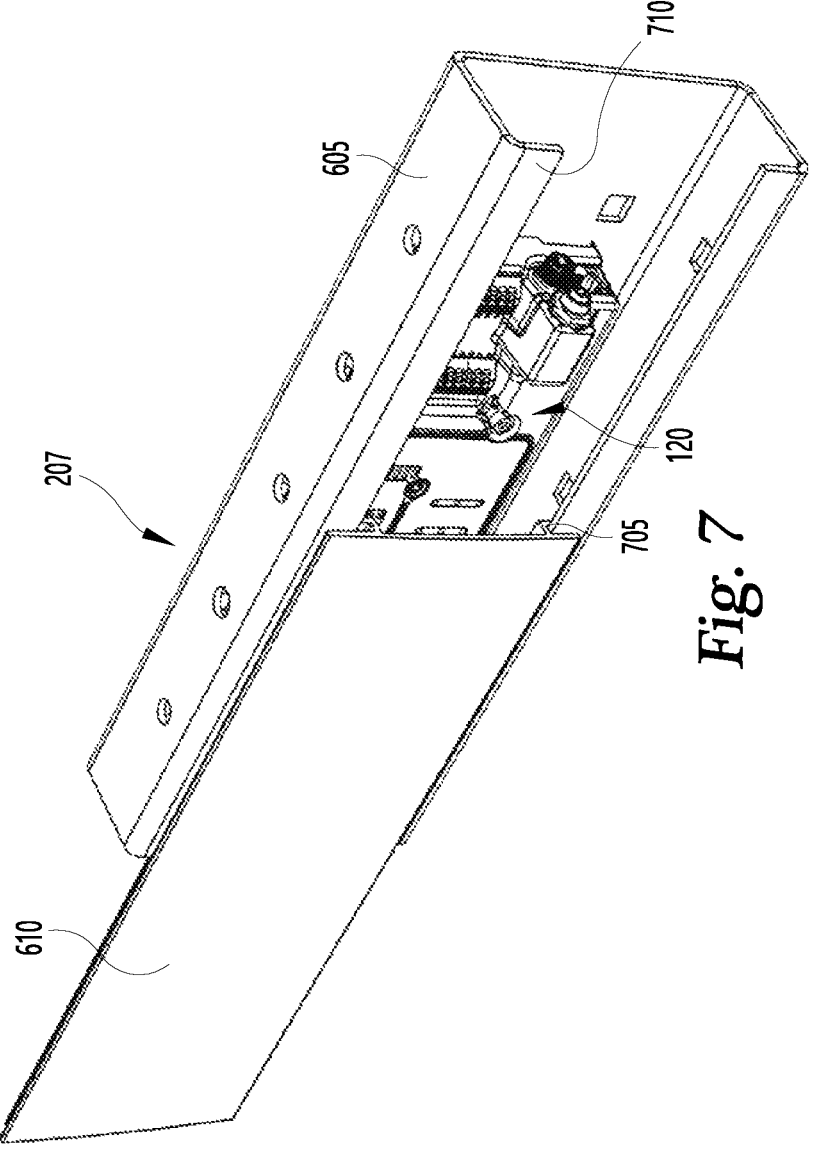
FIG. 7 is a perspective view of the controller card of FIG. 6.
Figure 8:
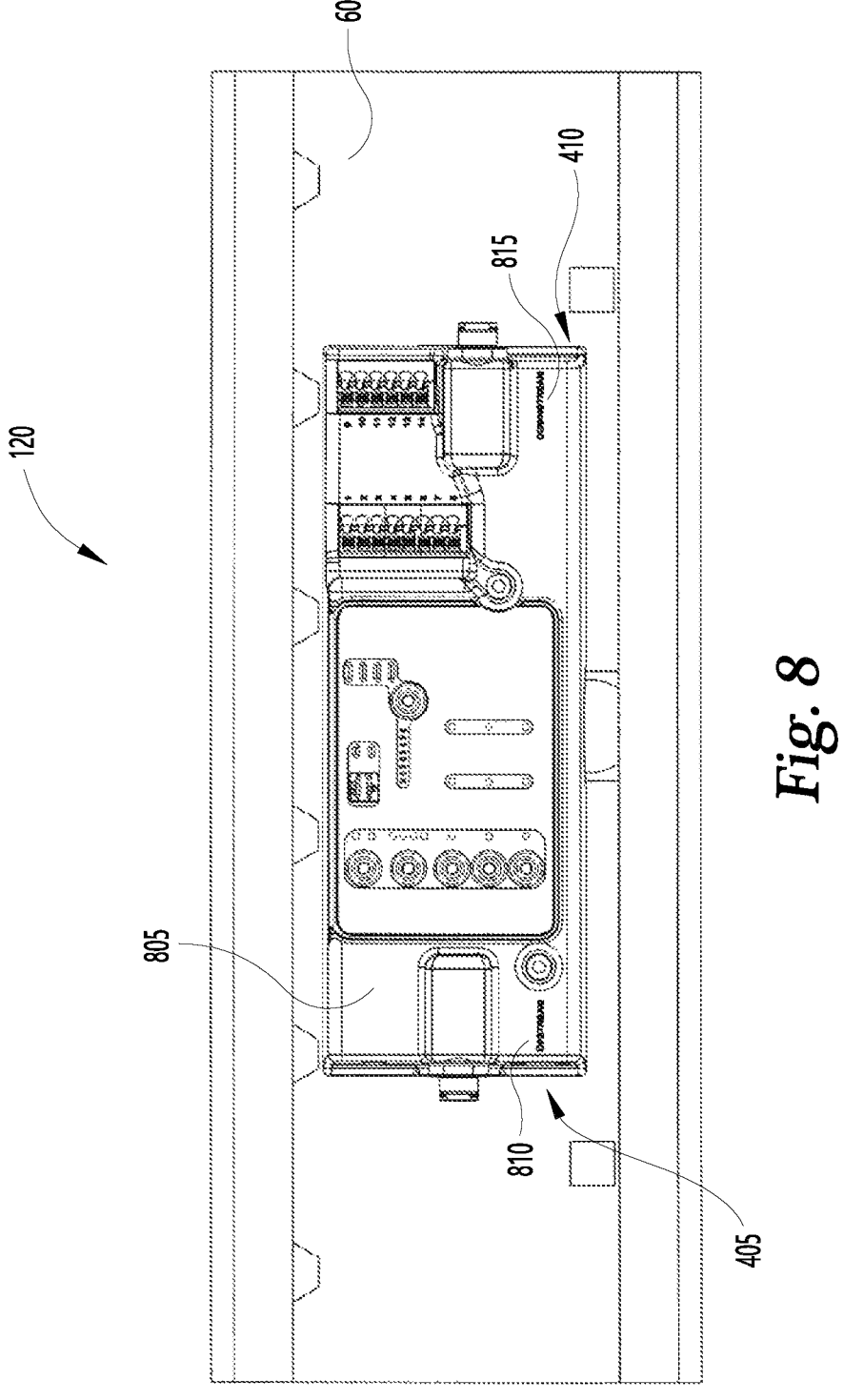
FIG. 8 is a front view of the controller card of FIG. 6.

Shown in FIGS. 6, 7, and 8, is an example of the controller card 120 described previously. The controller card 120 is typically retained within a channel 605 of the rails 207. The controller card 120 may be located behind an access panel 610 to prevent damage to the controller card 120. The access panel 610 is slidably removable from the channel 605 via groove 705. The groove 705 slides on a set of tracks 710 extending from the channel 605. The channel 605 is configured to surround and protect a circuit board 805, an upstream port 810, and a downstream port 815. As should be appreciated, the upstream port 810 corresponds to the upstream port 405 and the downstream port 815 corresponds to the downstream port 410 described in the previous examples.

Figure 9:
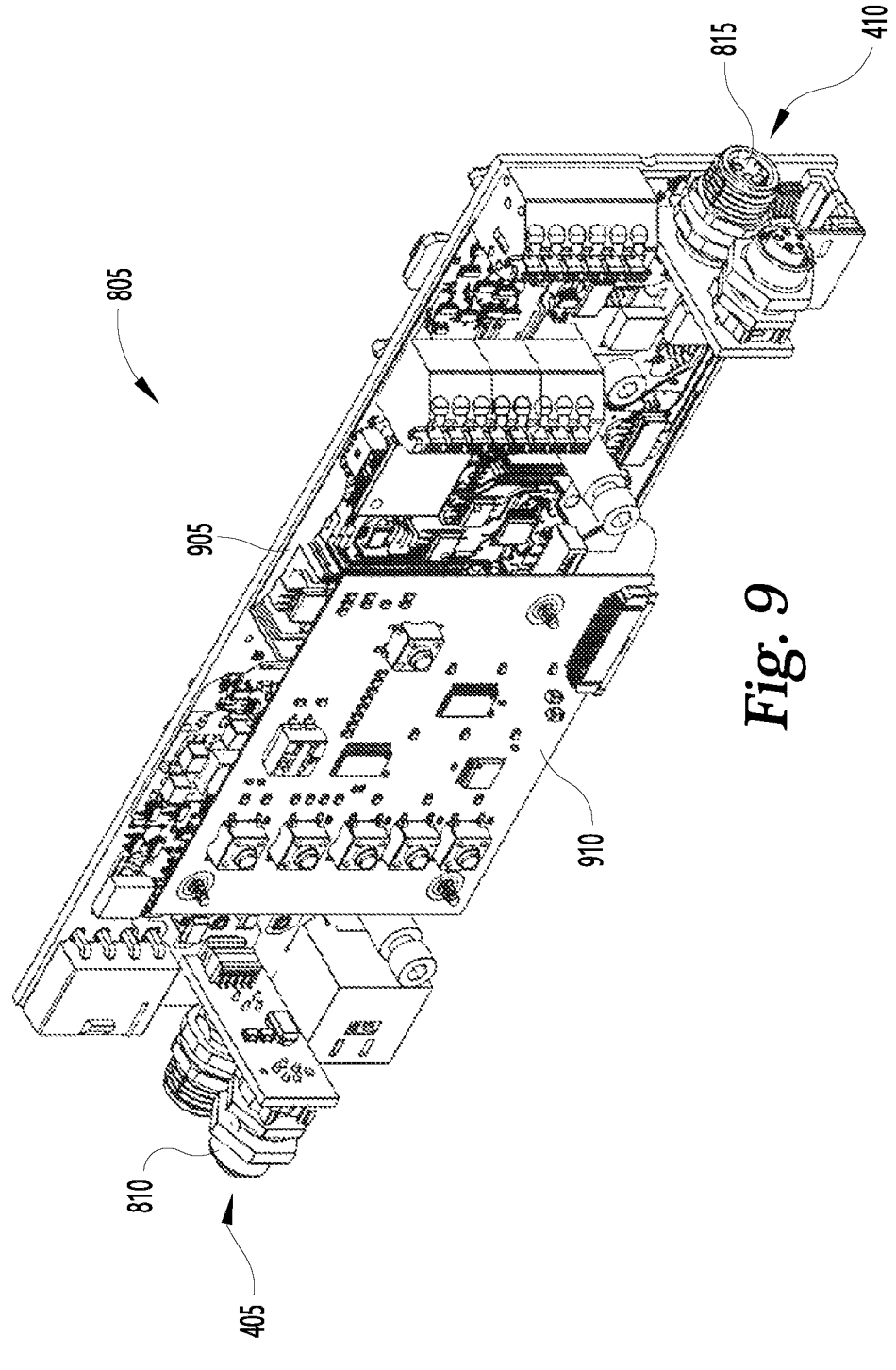
FIG. 9 is a perspective view of a circuit board.
Figure 10:
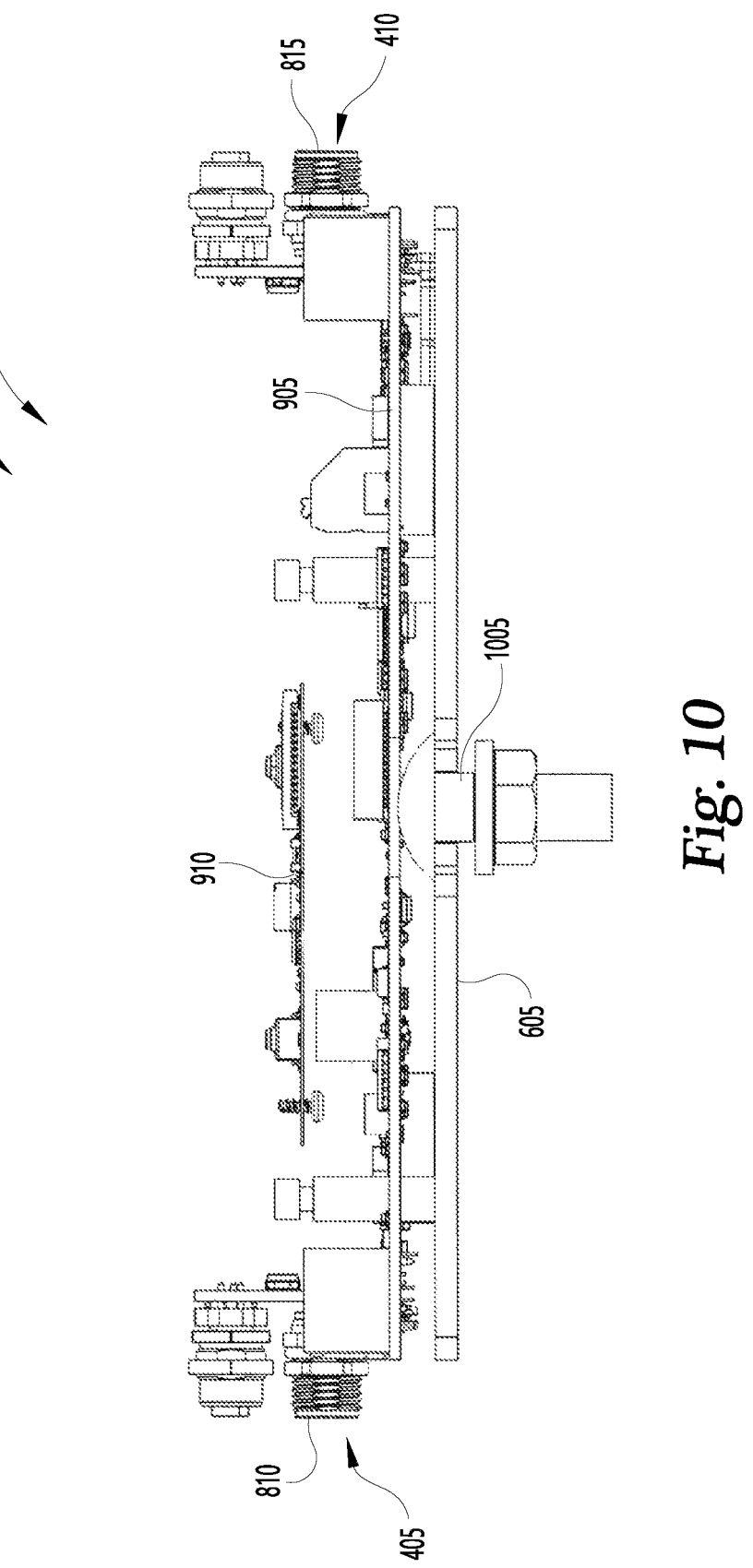
FIG. 10 is a top view of the circuit board of FIG. 9.

As shown in FIGS. 9 and 10, the circuit board 805 includes a main board 905 and a secondary board 910. The controller card 120 is mounted to a desired work location via a fastener 1005. The fastener 1005 may be a screw, bolt, rivet, weld, adhesive, and/or another type of fastener.

Figure 11A:
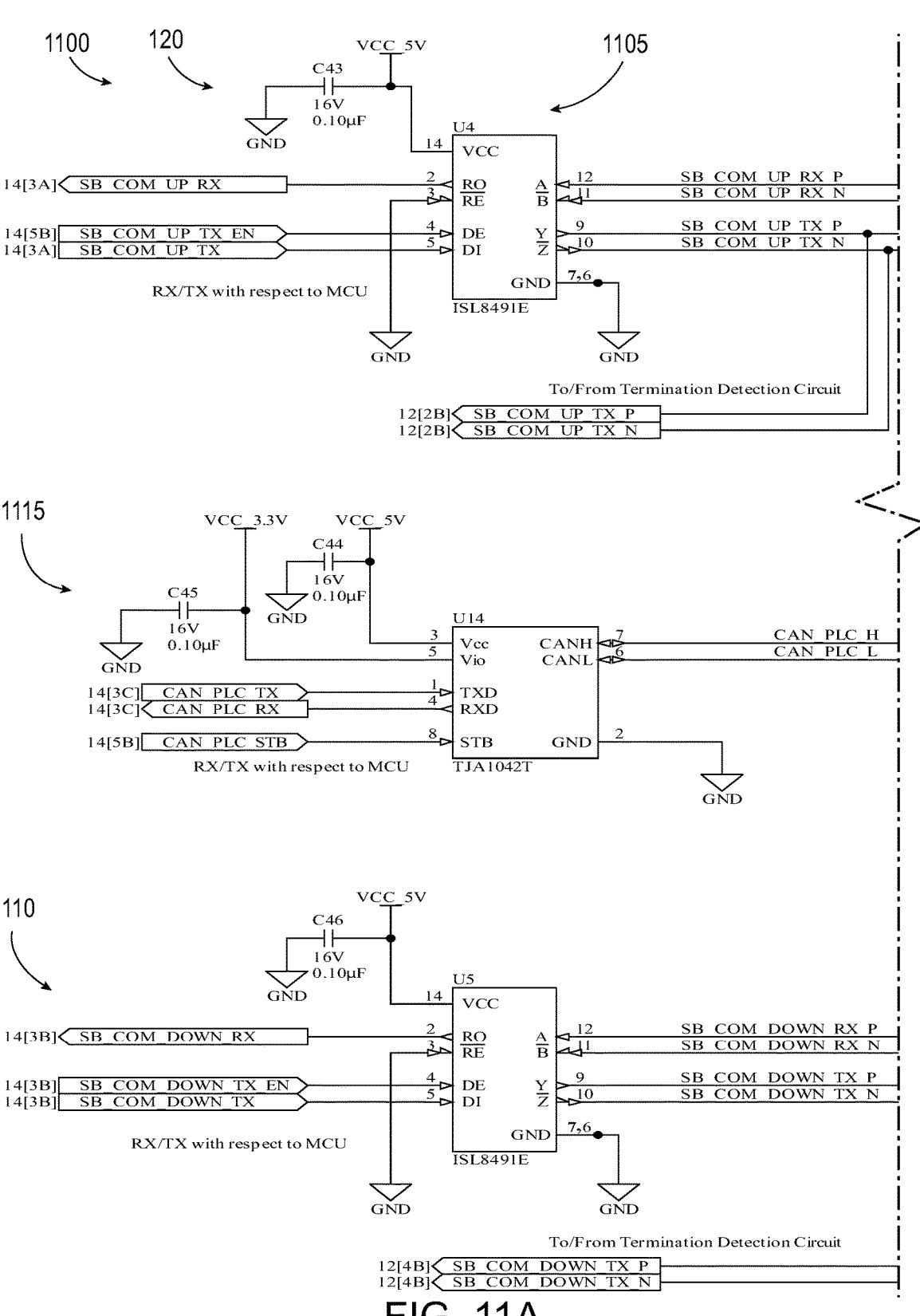
FIGS. 11A and 11B are a diagram a communication wiring diagram.
Figure 11B:
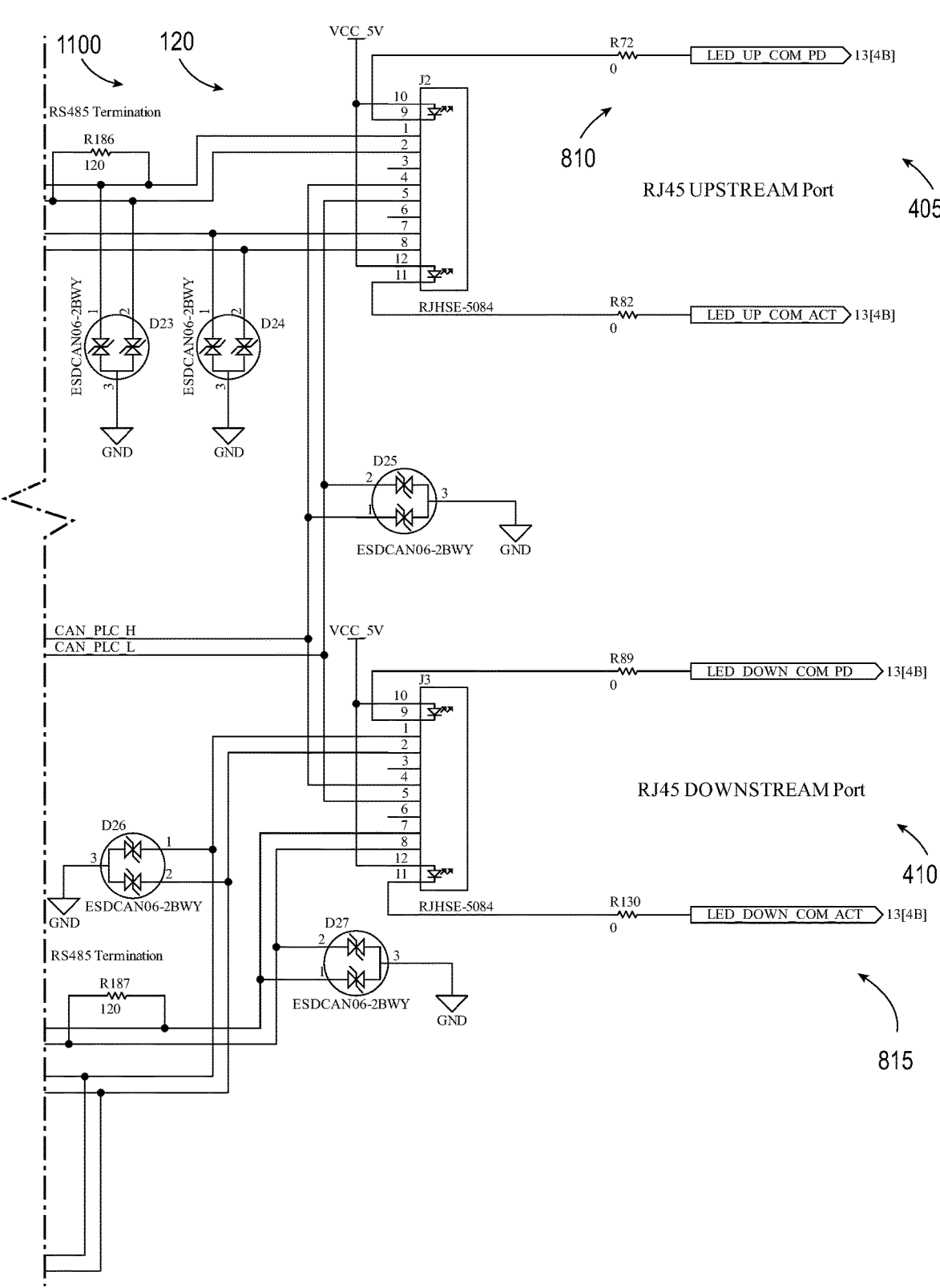

Illustrated in FIG. 11 is a communication wiring diagram 1100 for one version of the controller cards 120. The communication wiring diagram 1100 includes an upstream controller 1105, a downstream controller 1110, and a control area network (CAN) controller 1115. The upstream controller 1105 monitors the upstream port 810 described previously. For example, the upstream controller 1105 monitors the upstream port 810 to determine the controller card 120 position in a chain. The downstream controller 1110 monitors the downstream port 815 described previously. For example, the downstream controller 1110 monitors the upstream port 810 to determine the controller card 120 position in a chain. The control area network (CAN) controller 1115 monitors both the upstream port 810 and downstream port 815. If an error occurs the control area network (CAN) controller 1115 reports the error to a user.

Figure 12A:
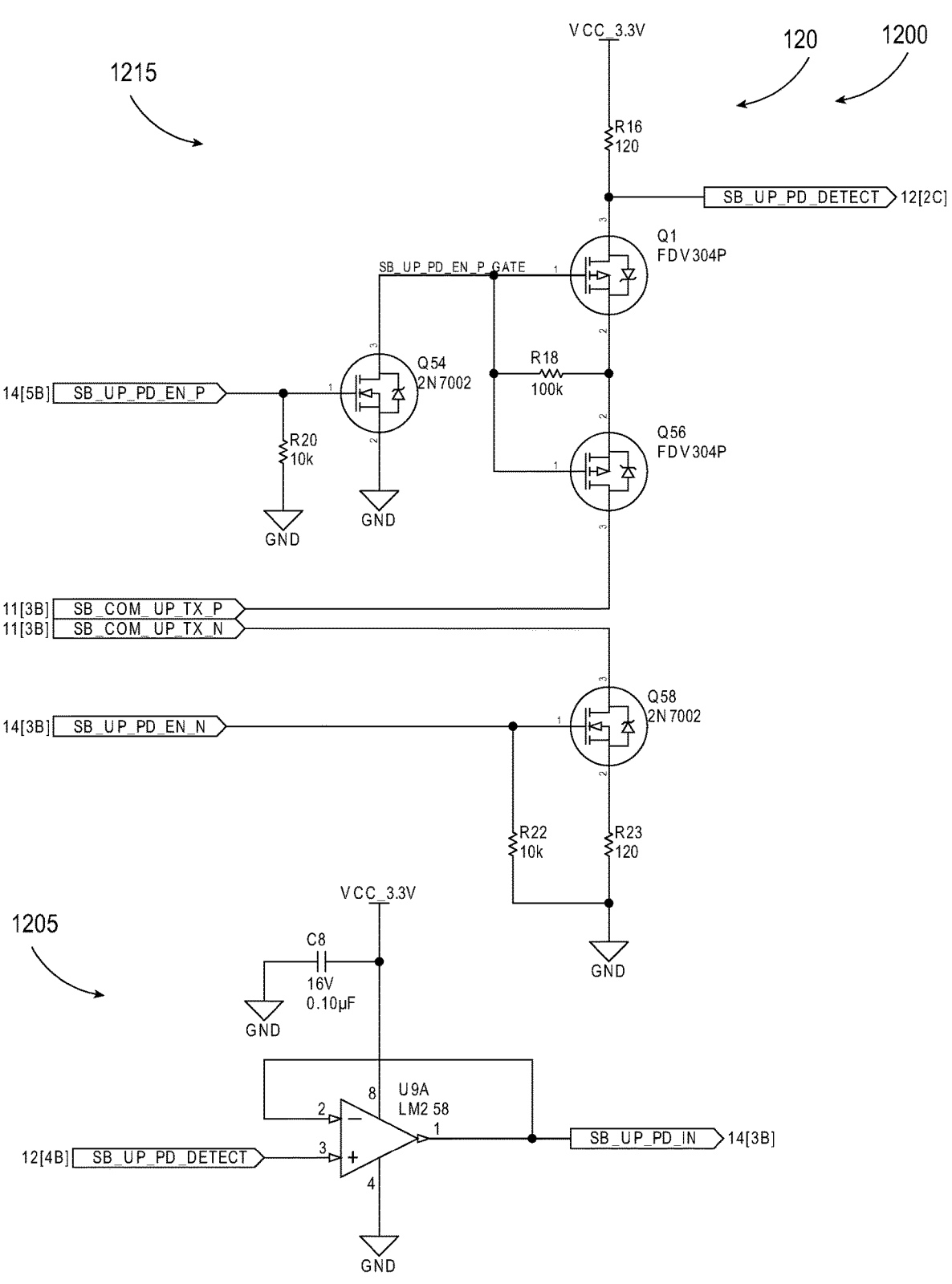
FIGS. 12A and 12B are a diagram a zone termination wiring diagram.
Figure 12B:
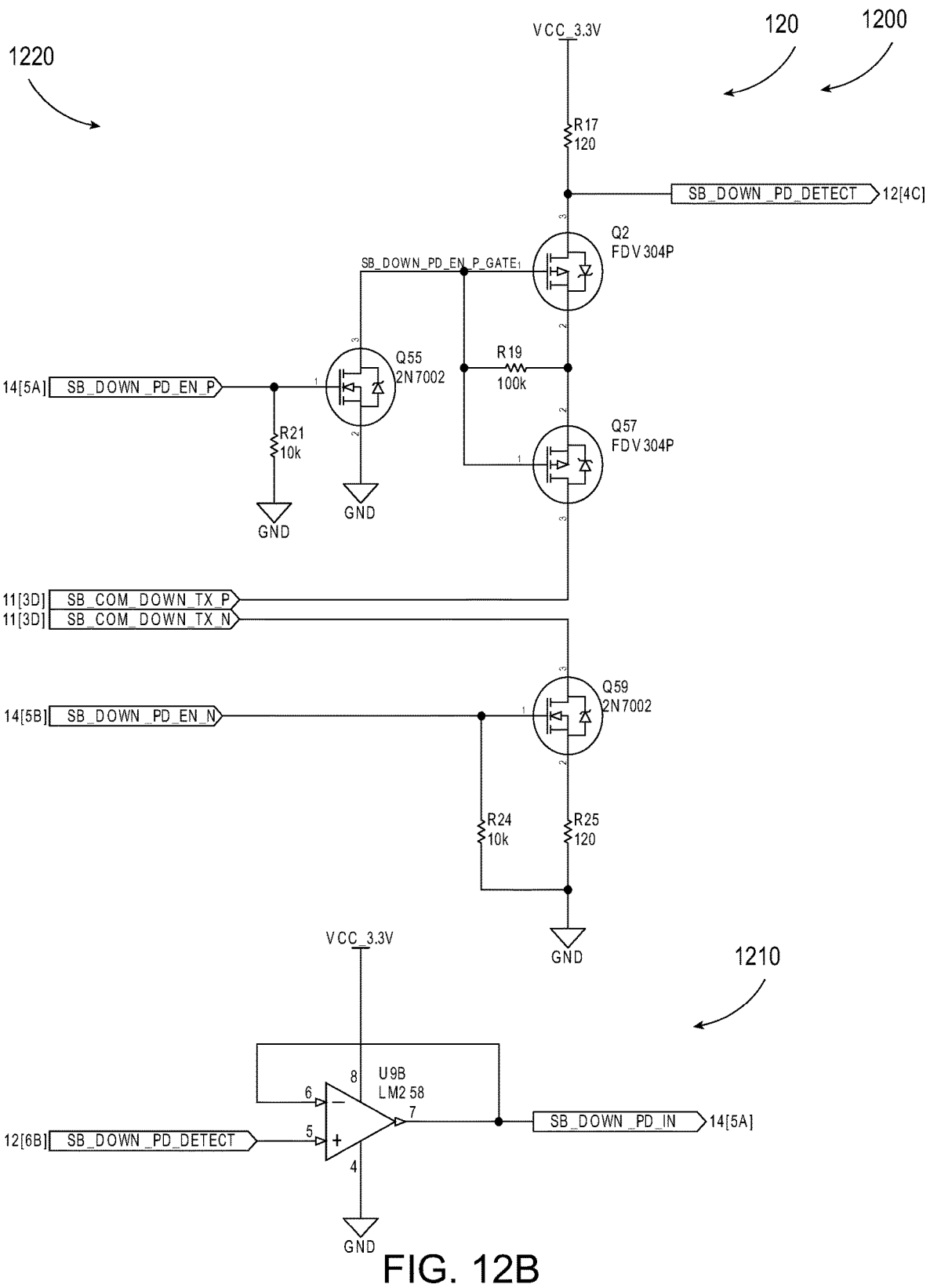

Illustrated in FIG. 12 is a zone termination wiring diagram 1200 for the controller card 120. The zone termination wiring diagram 1200 includes an upstream detection circuit 1205, a downstream detection circuit 1210, an upstream communication circuit 1215, and a downstream communication circuit 1220. The upstream detection circuit 1205 detects whether the upstream port 810 is receiving a signal. If not, the upstream detection circuit 1205 sends a signal to the upstream communication circuit 1215, which indicates that the controller card 120 is the first in a chain. The downstream detection circuit 1210 detects whether the downstream port 815 is a receiving a signal. If not, the downstream detection circuit 1210 sends a signal to the downstream communication circuit 1220, which indicates that the controller card 120 is the last in a chain.

Figure 13:
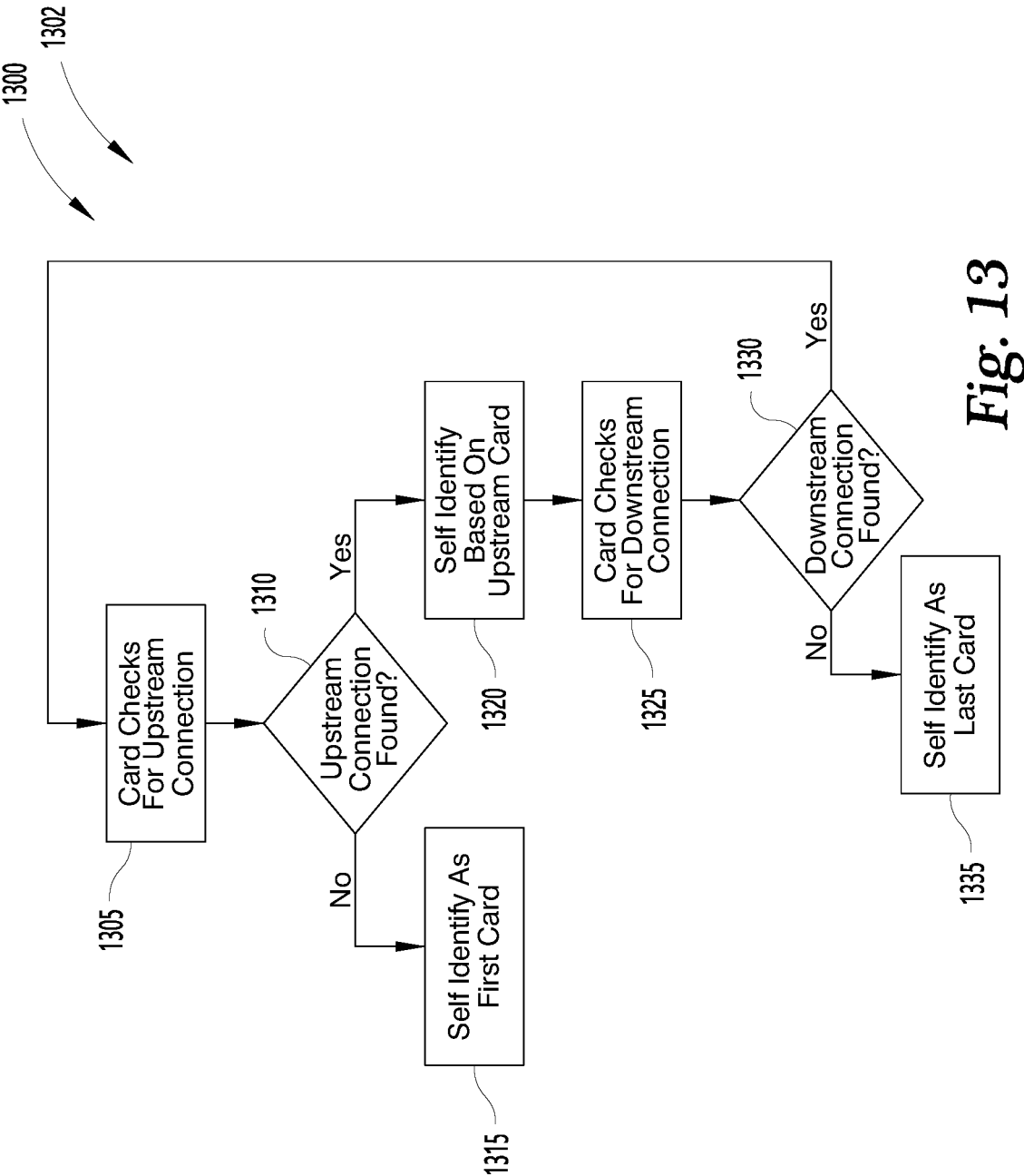
FIG. 13 is a flowchart of a card addressing process.

Shown in FIG. 13, is a flowchart 1300 of a card addressing process 1302. At stage 1305, the controller card 120 checks the upstream port 810 to determine if a signal is received. At stage 1310, if no signal is received, the controller card 120 identifies as the first, chain master 130 in the chain at stage 1315 with a card number of one (1), for example. If a signal is received, the controller card 120 self assigns a sequential number at stage 1320. For example, if the controller card 120 upstream of the target controller card 120 is number three (3), then the downstream target controller card 120 will self identify as controller card 120 number four (4) in the chain. At stage 1325, the controller card 120 checks the downstream port 815 to determine if a signal is received. At stage 1330, if no signal is received, the controller card 120 self identifies as the last or terminal card in the chain at stage 1335.

Figure 14:
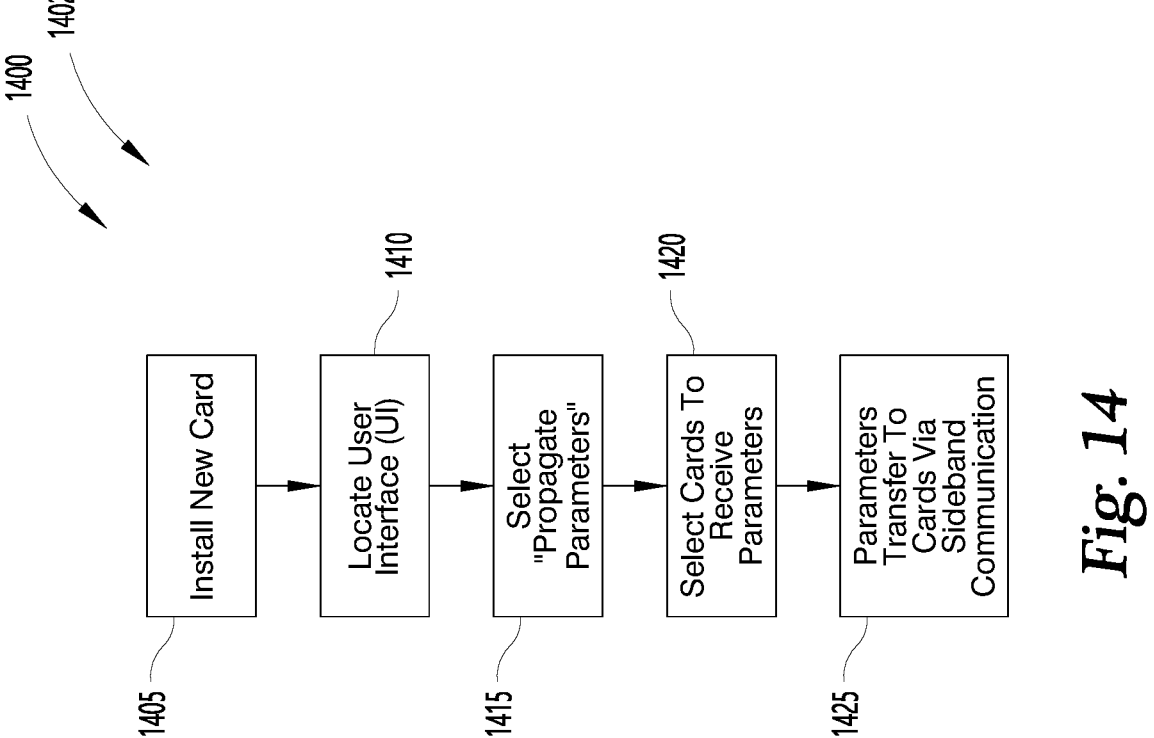
FIG. 14 is a flowchart of a parameter propagation process.

Looking at FIG. 14, a flowchart 1400 of a parameter propagation process 1402 is shown. At stage 1405, a new controller card 120 is installed in a conveyor zone 115. At stage 1410, the user locates a user interface (UI). The UI may be either on a remote electronic device and/or may be directly adjacent the controller card 120. In one example, the UI is on a remote computer. At stage 1415, the user selects a propagate parameters option within the UI. At stage 1420, the user selects the number of newly installed controller cards 120 to flash/upload the parameters to. At stage 1425, the parameters are uploaded to the controller card 120. In one example, the parameters include conveyor speed parameters. In another example, the parameters include MDR type and operation parameters.

During installation or maintenance of multiple controller cards 120, programming or setting the operational parameters for the individual cards can be a laborious process. The sideband communication system 500 is configured to facilitate this programming of multiple controller cards 120 at or nearly at the same time by propagating the settings of one card to the other cards. In one aspect, the sideband communication system 500 allows for the user interface (UI) to propagate operating parameters or settings to all of the cards through the sideband communication protocol almost instantaneously, or in some cases, in a sequential manner. In one form, the UI includes a series of buttons and light emitting diodes (LEDs), and in other forms, the UI includes a touchscreen or other types of UIs. In one example, a user selects a parameter and holds down a button on the selection for a few seconds before a selection window asks if the user wants to propagate the parameters to all connected controller cards 120. Via the sideband communication system 500, the controller card 120 transmits over the CAN the parameters to the other cards without having to program each separately.

Figure 15:
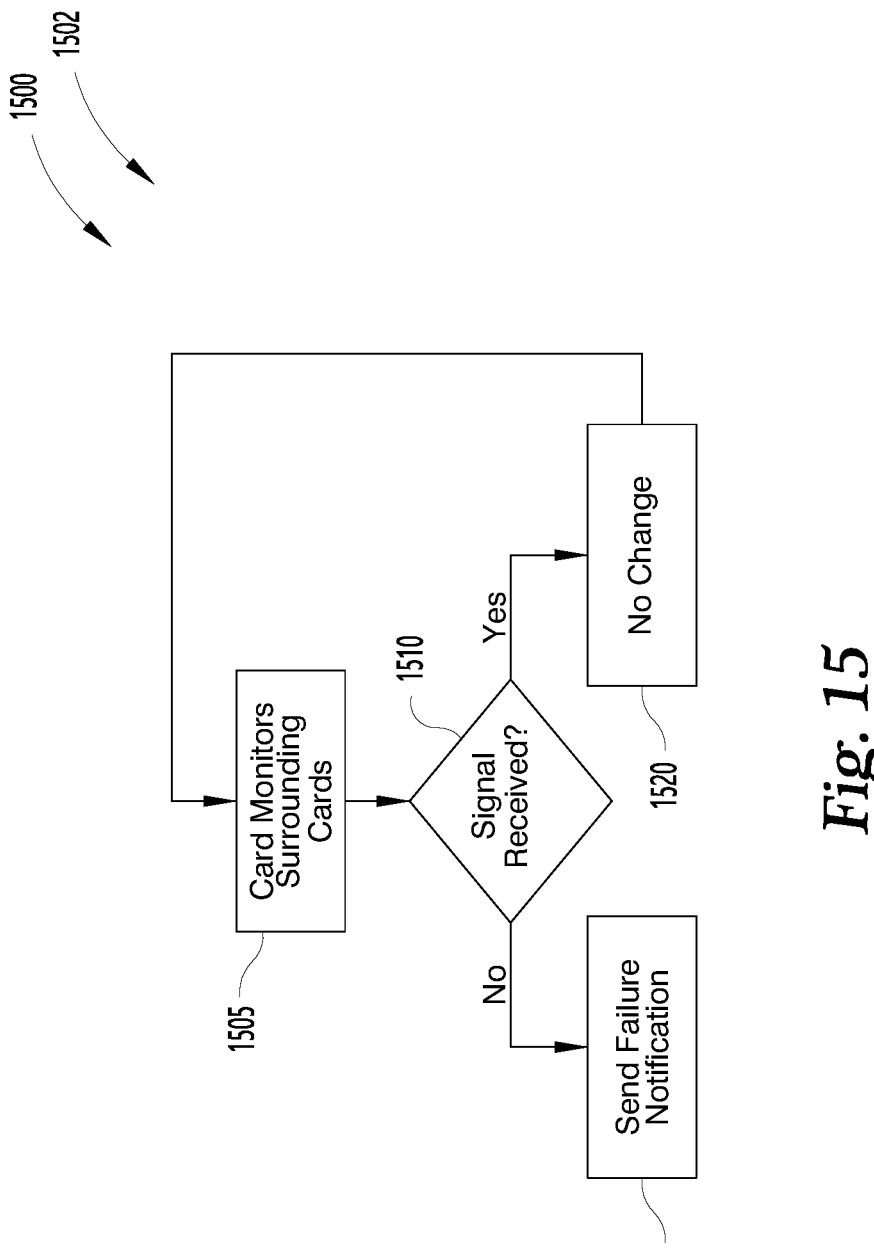
FIG. 15 is a flowchart of a failure detection process.

Illustrated in FIG. 15, is a flowchart 1500 showing a failure detection process 1502. At stage 1505, the controller card 120 monitors the surrounding controller cards 120 via a sideband communication system 500 via the upstream port 810 and downstream port 815. At stage 1510, if the card does not receive a signal, a failure notification is sent to a user at stage 1515. In some examples, the failure notification is an alert on a mobile device and/or computer. In another example, the alert is a visual or audible signal from the controller card 120. At stage 1510, if the card does receive a signal, there is no change and the process continues as normal at stage 1520.

The sideband communication system 500 further allows controller cards 120 to detect failures in neighboring cards. For example, when communication in a neighboring card is sporadic or even nonexistent, the controller card 120 in one variation sends a notification to the appropriate equipment (e.g., a PLC, computer, etc.) and/or personnel of the potential card failure. In other variations, the controller card 120 monitors signals and operating conditions of neighboring cards to determine their operational status. For instance, when an item is transferred from an upstream conveyor section controlled by an upstream card to a downstream conveyor section controlled by a downstream card and the downstream card does not signal receipt of the item back to the upstream card, either on a continuous or intermittent basis, the upstream card sends a notification of potential failure of the downstream card to the appropriate equipment and/or personnel.

Figure 16:
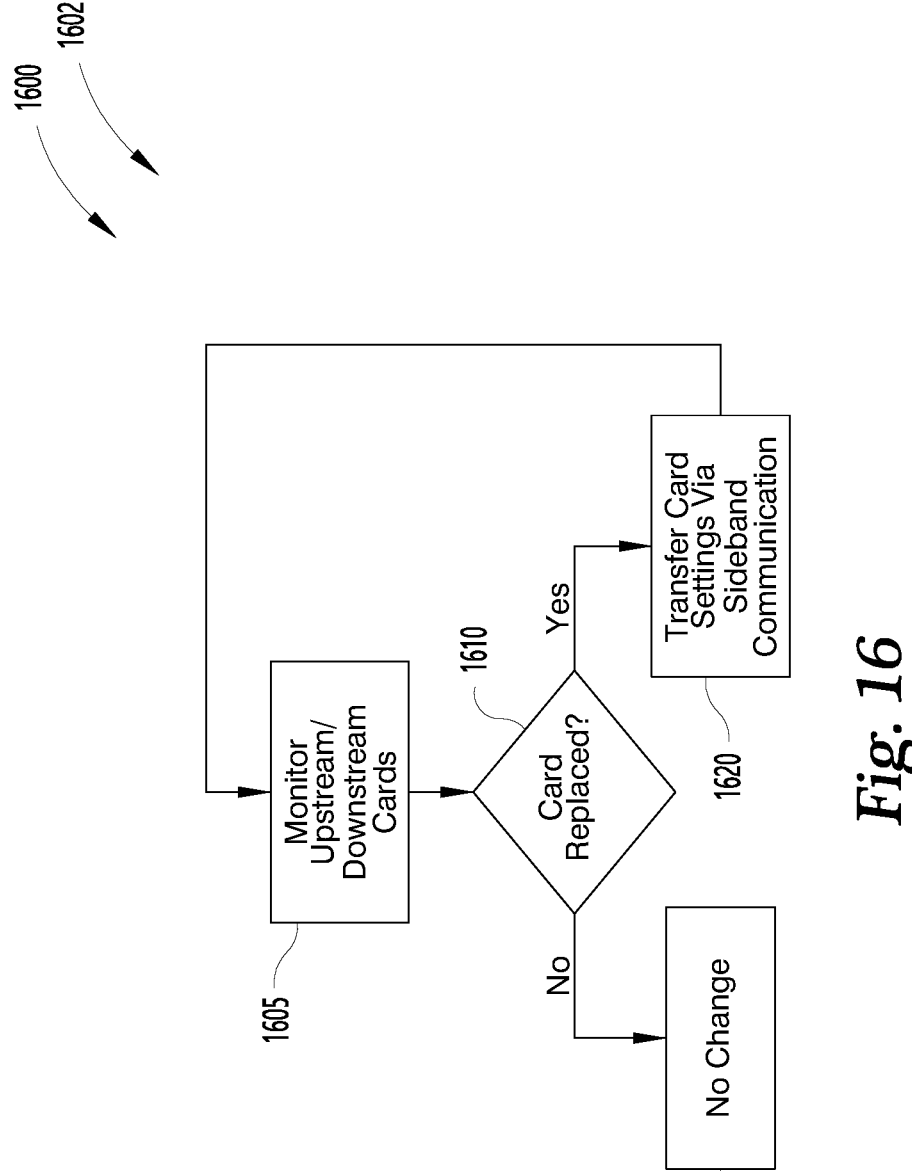
FIG. 16 is a flowchart of a settings transfer process.

Depicted in FIG. 16 is a flowchart 1600 of a settings transfer process 1602. At stage 1605, the controller card 120 monitors the upstream and downstream controller cards 120 via the upstream port 810 and downstream port 815. At stage 1610, the controller card 120 determines whether an upstream or downstream card is replaced. At stage 1615, if no card was replaced, the controller card 120 continues operation as usual. At stage 1620, if an upstream or downstream card was replaced, the controller card 120 can transfer the previous upstream/downstream cards settings onto the new controller card 120 via sideband communication system 500. This is done via a memory system that retains the settings information of the controller cards 120 immediately upstream and downstream of the card. As should be appreciated, this system allows for the replacement of two adjacent controller cards 120 without manual reprogramming. For example, in a series of four (4) controller cards 120, the two middle controller cards 120 can be replaced and automatically programmed by the exterior or bookending controller cards 120. As should be appreciated, this process can be continued down the entire line of daisy-chain connected controller cards 120 to replace almost all of the controller cards 120 without the need for manual reprogramming.

The sideband communication system 500 facilitates an automatic recovery mode or buddy capability that allows controller cards 120 to be readily replaced in case of card failure or system maintenance With this recovery capability, each card has memory for storing the settings of cards located immediately upstream and downstream from the card. The configuration information from the upstream and downstream cards in one example is communicated using the sideband communication system 500. When a failed controller card 120 is replaced with a new controller card 120, the upstream and/or downstream card automatically transfers the previous configuration settings to the new card using the sideband channel, thus saving time, effort, and money during card replacement. With each controller card 120 storing the settings for both the upstream and downstream cards, at least two intermediate control cards can be replaced and automatically programed by the upstream and downstream cards.

Figure 17:
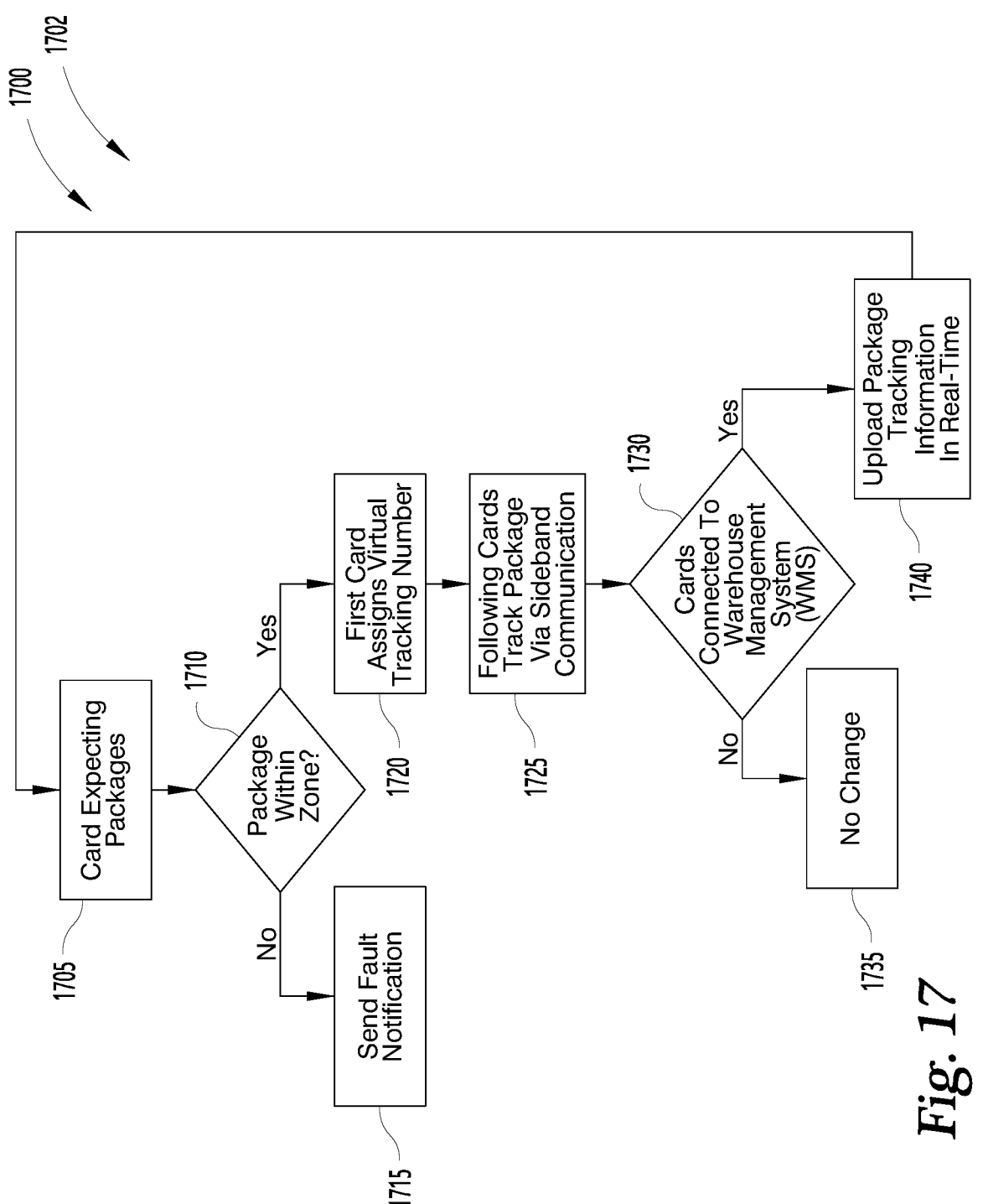
FIG. 17 is a flowchart of a package tracking process.

FIG. 17 shows a flowchart 1700 of a package tracking process 1702. At stage 1705 the controller card 120 is operational and expecting packages 240. At stage 1710, the controller card 120 detects whether a package 240 is within the conveyor zone 115. In one example, the controller card 120 detects a package 240 via a photoeye 250. The photoeye 250 sees the package 240 and transmits that information to the controller card 120. In another example, the controller card 120 detects the package 240 via electrical signal changes. For example, a change in current. If no package 240 is detected when expected, the controller card 120 sends a fault notification to a user indicating an error at stage 1715. If a package 240 is detected, the controller card 120 assigns a virtual tracking number associated with the package 240 at stage 1720. At stage 1725, the subsequent downstream cards continue to monitor the movement and position of the package 240 via transfer of the virtual tracking number through the sideband communication system 500. At stage 1730, the controller card 120 determines whether there is a connection to a warehouse management system 105. If not, the process continues as usual at stage 1735. If the controller card 120 is connected to a warehouse management system 105, the controller card 120 constantly uploads the package tracking information to the warehouse management system 105 for real-time tracking of packages 240 at stage 1740.

The sideband communication system 500 further allows scanner-less, zone-to-zone tracking of packages 240 or other items along various conveyor zones 115. The system in one form is configured to track packages 240 in the conveyor zones 115 by assigning virtual tracking numbers. Alternatively or additionally, the system receives a unique identifier for the package 240 from a barcode and/or radio frequency identification (RFID) scanner located along an upstream conveyor zone. Once identified, the package 240 can be tracked along various conveyor zones 115 without the need for rescanning because the controller card 120 through the sideband communication system 500 communicates the package identifiers when the packages 240 are moved along and/or transferred from the various conveyor zones 115.

For instance, when a package 240 is received on a conveyor zone 115 controlled by a card, the upstream card sends to the current conveyor section card the identifier for the package, and the current conveyor card stores the package identifier in memory. Based on the conveyor speed and information from sensors along the conveyor section as well as other factors, the controller card 120 determines and tracks the location of the package 240 on the conveyor zone 115. Through the CAN, the controller card 120 in one form transmits the package identifier (either virtual or actual identifier) as well as other information to the warehouse management system 105 or other system so that the package location is tracked throughout a facility. Before, during, or after the tracked package 240 leaves the conveyor zone 115 controlled by the controller card 120, the card transmits the package identifier to the downstream card so that the package can then be tracked along the downstream conveyor zone.

Figure 18:
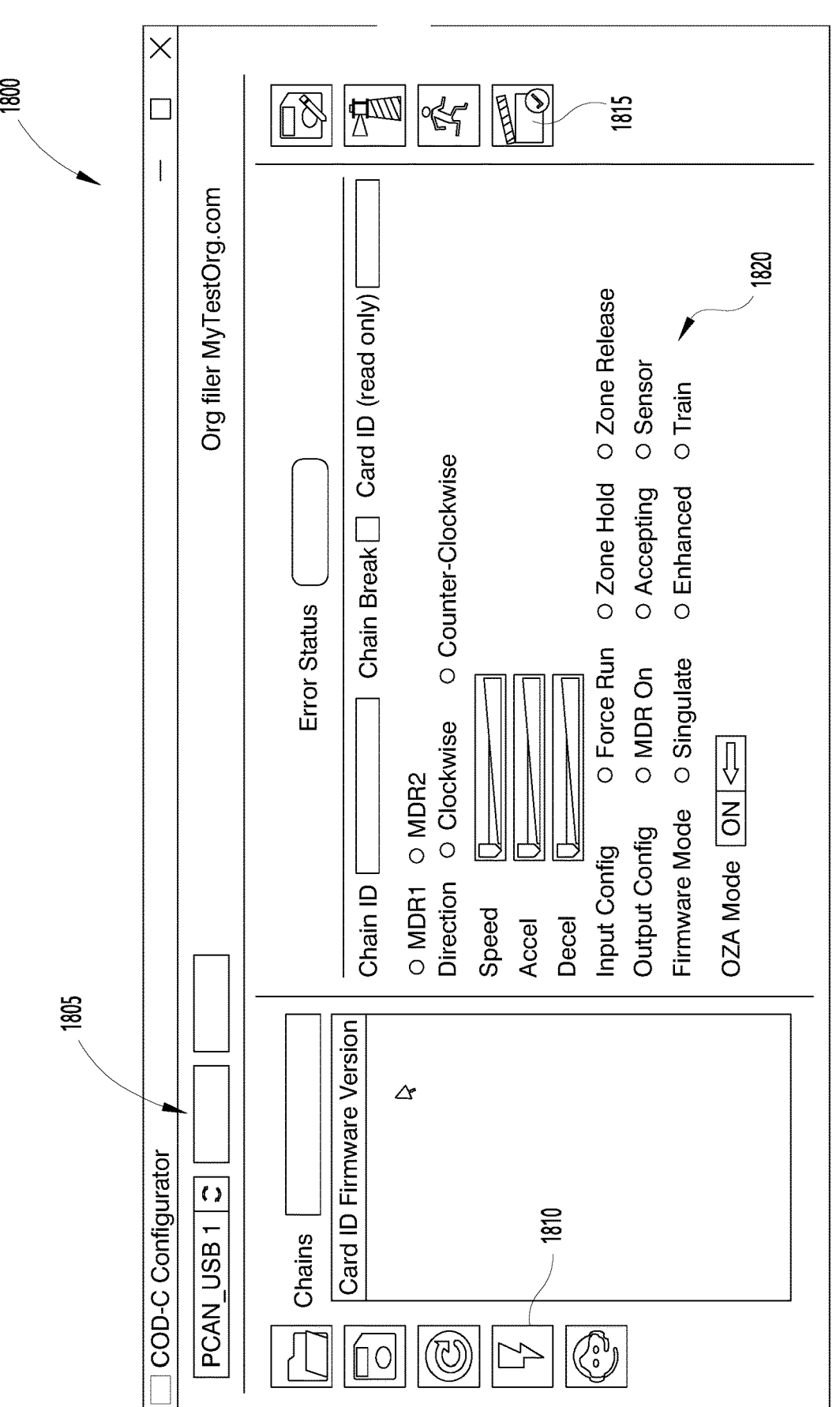
FIG. 18 is a diagrammatic view of a user interface (UI).
Figure 19:
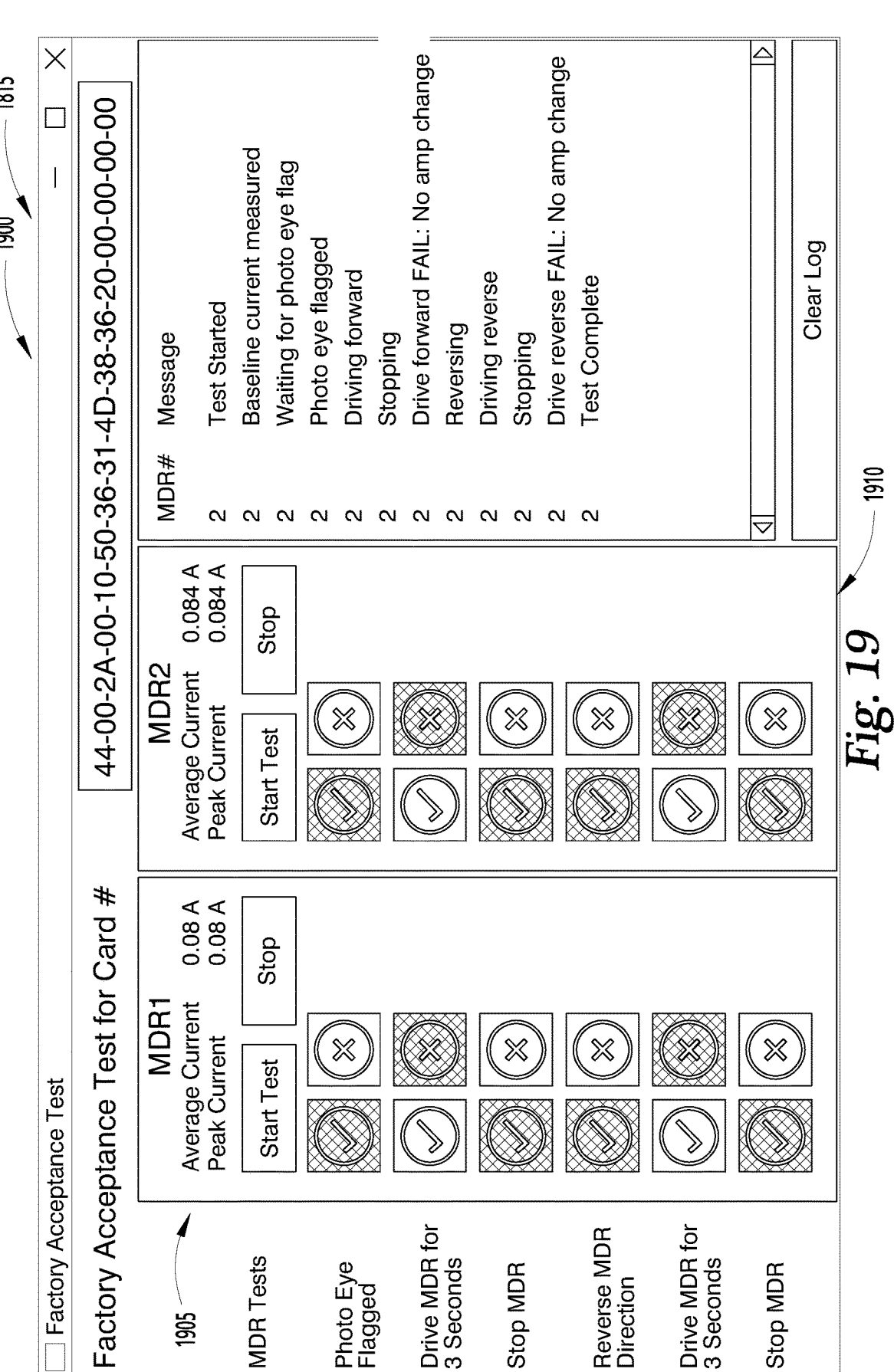
FIG. 19 is a diagrammatic view of a testing interface.

FIGS. 18 and 19 show an example of a user interface (UI) 1800. The user interface (UI) 1800 includes a card connection button 1805, a firmware flash button 1810, a testing button 1815, and conveyor settings 1820. The card connection button 1805 is used to connect a controller card 120 to the user interface (UI) 1800. Once the user interface (UI) 1800 is connected to the controller card 120, a user may adjust settings of the controller card 120 via the conveyor settings 1820. The conveyor settings 1820 may include motor speed, acceleration, deceleration, conveyor configuration, conveyor release mode, motor direction, and/or any other desirable settings.

Using the firmware flash button 1810, a user can flash firmware onto one or more controller cards 120. This can be done via the sideband communication system 500 or via the CAN. For example, a user may select a particular controller card 120 via the card connection button 1805 and then via the firmware flash button 1810 the user can transfer updated or new firmware onto the controller card 120.

Using the testing button 1815 a user can access a testing interface 1900. The testing interface 1900 includes a first motorized drive roller (MDR) test 1905 and a second motorized drive roller (MDR) test 1910. The first motorized drive roller (MDR) test 1905 and second motorized drive roller (MDR) test 1910 may be used for factory acceptance testing to determine if a controller card 120 meets the required specifications. The first motorized drive roller (MDR) test 1905 and second motorized drive roller (MDR) test 1910 may test the controller card 120 by driving the MDR, stopping the MDR, reversing the MDR, flagging the photoeye 250, reading the current draw during operation, comparing current draw at idle and operation, and/or any combination thereof.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example if the stated value is 4.375, then use of the term "about 4.375" generally means a range between 3.9375 and 4.8125.

"And/Or" generally refers to a grammatical conjunction indicating that one or more of the cases it connects may occur. For instance, it can indicate that either or both of two stated cases can occur. In general, "and/or" includes any combination of the listed collection. For example, "X, Y, and/or Z" encompasses: any one letter individually (e.g., {X}, {Y}, {Z}); any combination of two of the letters (e.g., {X, Y}, {X, Z}, {Y, Z}); and all three letters (e.g., {X, Y, Z}). Such combinations may include other unlisted elements as well.

"Channel" generally refers to a long, narrow groove in a surface of an object.

"Communication Link" or "Communication Channel" generally refers to a connection between two or more communicating entities and may or may not include a communications channel between the communicating entities. The communication between the communicating entities may occur by any suitable means. For example, the connection may be implemented as an actual physical link, an electrical link, an electromagnetic link, a logical link, or any other suitable linkage facilitating communication. In the case of an actual physical link, communication may occur by multiple components in the communication link configured to respond to one another by physical movement of one element in relation to another. In the case of an electrical link, the communication link may be composed of multiple electrical conductors electrically connected to form the communication link. In the case of an electromagnetic link, elements of the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum. In the case of a logical link, the communication links may be a conceptual linkage between the sender and recipient such as a transmission station in the receiving station. Logical link may include any combination of physical, electrical, electromagnetic, or other types of communication links.

"Communication Node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry, and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry, and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Conveyor" is used in a broad sense to generally refer to a mechanism that is used to transport something, like an item, box, container, and/or SKU. By way of non-limiting examples, the conveyor can include belt conveyors, wire mesh conveyors, chain conveyors, electric track conveyors, roller conveyors, cross-belt conveyors, vibrating conveyors, and skate wheel conveyors, to name just a few. The conveyor all or in part can be powered or unpowered. For instance, sections of the conveyors can include gravity feed sections.

"Conveyor Zone" or "Zone" generally refers to a section of a conveyor. For example, a conveyor zone includes a section of conveyor driven by a single motorized drive roller (MDR) and/or other types of conveyor motors.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour. Data may be organized and represented in a structured format. Examples include a tabular representation using rows and columns, a tree representation with a set of nodes considered to have a parent-children relationship, or a graph representation as a set of connected nodes to name a few. The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Frame" generally refers to the structure which supports the mechanical components of a conveyor and/or sorter that are configured to move items.

"Main Communication Channel" or "Main Communication Link" generally refers to a physical medium (e.g., wires or cables) and/or intangible constructs (e.g., frequencies, addresses, etc.) where normal network communications occur.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM). Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Microcontroller" or "MCU" generally refers to a small computer on a single integrated circuit. It may be similar to, but less sophisticated than, a System on a Chip or "SoC"; an SoC may include a microcontroller as one of its components. A microcontroller may contain one or more CPUs (processor cores) along with memory and programmable input/output peripherals. Program memory in the form of ferroelectric RAM, NOR flash or OTP ROM may also be included on the chip, as well as a small amount of RAM. Microcontrollers may be designed for embedded applications, in contrast to the microprocessors used in personal computers or other general purpose applications consisting of various discrete chips. Microcontrollers may be included in automatically controlled products and devices, such as automobile engine control systems, implantable medical devices, remote controls, office machines, appliances, power tools, toys and other embedded systems. An MCU may be configured to handle mixed signals thus integrating analog components needed to control non-digital electronic systems. Some microcontrollers may use four-bit words and operate at frequencies as low as 4 kHz, for low power consumption (single-digit milliwatts or microwatts). They will generally have the ability to retain functionality while waiting for an event such as a button press or other interrupt; power consumption while sleeping (CPU clock and most peripherals off) may be just nanowatts, making many of them well suited for long lasting battery applications. Other microcontrollers may serve performance roles, where they may need to act more like a Digital Signal Processor (DSP), with higher clock speeds and power consumption. A microcontroller may include any suitable combination of circuits such as: 1. a central processing unit—ranging from small and simple processors with registers as small as 4 bits or list, to complex processors with registers that are 32, 64, or more bits 2. volatile memory (RAM) for data storage 3. ROM, EPROM, EEPROM or Flash memory for program and operating parameter storage 4. discrete input and output bits, allowing control or detection of the logic state of an individual package pin 5. serial input/output such as serial ports (UARTs) 6. other serial communications interfaces like PC, Serial Peripheral Interface and Controller Area Network for system interconnect 7. peripherals such as timers, event counters, PWM generators, and watchdog 8. clock generator—often an oscillator for a quartz timing crystal, resonator or RC circuit 9. many include analog-to-digital converters, some include digital-to-analog converters 10. in-circuit programming and in-circuit debugging support.

"Motorized Drive Roller" or "MDR" generally refers to a powered conveyor roller with an internally mounted motor that is configured to rotate or spin the roller. The MDR may be controlled via internal and/or external commutation. In one form, the motor for the MDR includes an electric DC motor.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, 4G, or 5G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards. The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Optionally" means discretionary; not required; possible, but not compulsory; left to personal choice.

"Photoeye", "PE", or "Photoelectric Sensor" generally refers to a device configured to detect the presence, absence, and/or distance of an object with a light transmitter (or emitter) and a photoelectric receiver. In one form, the emitter and receiver are integrated to form a single unit, and in another form, the emitter and receiver are separate components. Photoeyes can be generally categorized into three different types, opposed (through-beam), retro-reflective, and proximity-sensing (diffused) types.

"Predominately" is synonymous with greater than 50%.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. The concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Roller" generally refers to a cylindrically shaped material handling component that is able to revolve. Typically, but not always, the roller is configured to provide mechanical power transmission, a conveying surface, and/or support for conveyed objects or items. The roller can be powered or unpowered.

"Sideband Communication" generally refers to a communication protocol or technique where normal network communications are transmitted as well as other services are provided via a main communication channel and where a separate communication channel (or sideband channel) is used to facilitate separate peer to peer communications. The sideband communication can occur in wired and/or wireless networks. For example, in a wired Ethernet network environment, normal controller area network communications can occur in the standard wires that form the main communication channel used for normal network communication and the sideband communication channel can exist on the unused wires for the main Ethernet communication protocol. For instance, the sideband communications can occur using a serial RJ485 standard. In wireless networks, the main communication channel is typically associated with a carrier frequency, and the sideband communications can occur on the lower sideband (USB) or the upper sideband (USB) lobe frequencies around the carrier frequency. In other examples where the wireless communication is digital, different addresses or other signifiers can be used to delineate the main and sideband communication channels.

"Sideband Communication Channel" or "Sideband Communication Link" generally refers to a physical medium (e.g., wires or cables) and/or intangible constructs (e.g., frequencies, addresses, etc.) where communications outside normal network communications occur. The sideband communication channel is separate and distinct from the main communication channel on a given network such that communications on the sideband communication channel have no impact on communications on the main communication channel.

"Stock Keeping Unit" (SKU) or "Item" generally refers to an individual article or thing. The SKU can come in any form and can be packaged or unpackaged. For instance, SKUs can be packaged in cases, cartons, bags, drums, containers, bottles, cans, pallets, and/or sacks, to name just a few examples. The SKU is not limited to a particular state of matter such that the item can normally have a solid, liquid, and/or gaseous form for example.

"Storage Container" generally refers to an object that can be used to hold or transport SKUs or other objects. By way of non-limiting examples, the storage container can include cartons, totes, pallets, bags, and/or boxes.

"Storage Facility" generally refers to a location for keeping and/or storing items or goods. A storage facility may keep the items or goods indoors or outdoors. As an example, a storage facility may be a large building, such as a warehouse, or may be an outdoor area that is either open or enclosed by a fence or by another suitable method.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Transceiver" generally refers to a device that includes both a transmitter and a receiver that share common circuitry and/or a single housing. Transceivers are typically, but not always, designed to transmit and receive electronic signals, such as analog and/or digital radio signals.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 conveyor system
105 warehouse management system 110 programmable logic controllers
115 conveyor zone
120 controller card
125 communication cable
130 chain master
200 conveyor system
205 conveyor
206 frame
207 rails
208 rollers
210 first zone
215 second zone
220 third zone
225 first controller card
230 third controller card
240 packages
242 main communication channel
245 sideband communication channel
250 photoeye
300 power system
305 bus power
310 switch
320 conveyor power connector
322 current sensor
325 regulator
330 photoeye
335 light emitting diode
340 brake
345 chopper
350 logic power
355 power path selector
400 communication system
405 upstream port
410 downstream port
415 motor control unit
420 first network carrier transceiver
425 upstream sideband transceiver
427 downstream sideband transceiver
428 first carrier network connection
429 sideband connections
430 second network carrier transceiver
431 second carrier network
432 motor control unit carrier link
433 motor control unit sideband link
435 first electrical device
440 second electrical device
442 direct conveyor connection
445 termination resistor
450 CAN gateway
500 sideband communication system
510 first controller card
520 second controller card
605 channel
610 access panel
705 groove
710 track
805 circuit board
810 upstream port
815 downstream port
905 main board
910 secondary board
1005 fastener
1100 communication wiring diagram
1105 upstream controller
1110 downstream controller
1115 control area network (CAN) controller
1200 zone termination wiring diagram 1205 upstream detection circuit
1210 downstream detection circuit
1215 upstream communication circuit
1220 downstream communication circuit
1300 flowchart
1302 card addressing process
1305 stage
1310 stage
1315 stage
1320 stage
1325 stage
1330 stage
1335 stage
1400 flowchart
1402 parameter propagation process
1405 stage
1410 stage
1415 stage
1420 stage
1425 stage
1500 flowchart
1502 failure detection process
1505 stage
1510 stage
1515 stage
1520 stage
1600 flowchart
1602 settings transfer process
1605 stage
1610 stage
1615 stage
1620 stage
1700 flowchart
1702 package tracking process
1705 stage
1710 stage
1715 stage
1720 stage
1725 stage
1730 stage
1735 stage
1740 stage
1800 user interface (UI)
1805 card connection button
1810 firmware flash button
1815 testing button
1820 conveyor settings
1900 testing interface
1905 first motorized drive roller (MDR) test
1910 second motorized drive roller (MDR) test

What is claimed is:

1. A conveyor system, comprising:

one or more controller cards that are dedicated to control individual conveyor zones;

wherein the controller cards include an existing controller card and an adjacent controller card;

wherein the existing controller card is communicatively connected to the adjacent controller card to form a network;

wherein the adjacent controller card is located adjacent to the existing controller card along the network;

wherein the existing controller card has memory configured to store configuration settings of the adjacent controller card;

wherein the existing controller card is configured to detect replacement of the adjacent controller card with a replacement controller card on the network; and wherein the existing controller card is configured to automatically transfer the configuration settings of the adjacent controller card over the network to the replacement controller card to automatically program the replacement card.

2. The conveyor system of claim 1, wherein the controller cards each have an upstream port and a downstream port configured to respectively communicate with upstream and downstream controller cards.

3. The conveyor system of claim 2, wherein the controller cards are configured to automatically self-identify.

4. The conveyor system of claim 3, wherein the controller cards are configured to self-identify based on a type of sensor connected to the controller cards.

5. The conveyor system of claim 4, wherein the sensor includes a wake-up photoeye.

6. The conveyor system of claim 3, wherein the controller cards are configured to self-identify in a sequential manner based on a card identifier from an upstream controller card.

7. The conveyor system of claim 3, wherein the controller cards are configured to self-identify based on a port connection status.

8. The conveyor system of claim 1, wherein the controller cards include one or more inputs and/or outputs.

9. The conveyor system of claim 8, further comprising a programmable logic controller (PLC) is configured to reconfigure the inputs and/or outputs of the controller cards.

10. The conveyor system of claim 9, wherein the PLC is adapted to reconfigure at least one of the controller cards over the network.

11. The conveyor system of claim 10, wherein the controller cards are configured to send a notification over the network to the PLC.

12. The conveyor system of claim 9, further comprising a computer configured to remotely flash the controller cards using a window based interface.

13. The conveyor system of claim 1, wherein the conveyor system is configured to perform scanner-less zone-to-zone tracking of items transported via the conveyor system.

14. The conveyor system of claim 13, wherein the controller cards are configured to communicate identifiers for the items to a downstream controller card as the items transition to a downstream conveyor zone controlled by the downstream controller.

15. The conveyor system of claim 14, wherein the identifiers are virtual identifiers created by the controller cards.

16. The conveyor system of claim 13, wherein the controller cards are configured to communicate zone-to-zone tracking information to a warehouse management system (WMS).

17. The conveyor system of claim 1, wherein the controller cards are configured to automatically detect failures of neighboring controller cards.

18. The conveyor system of claim 17, wherein the controller cards are configured to communicate card failures on behalf of the failed neighboring controller card.

19. The conveyor system of claim 17, wherein the controller cards are configured to detect card failures based on communication status of the neighboring controller card.

20. The conveyor system of claim 17, wherein the controller cards are configured to detect card failures based on veracity of operational conditions communicated by the neighboring controller cards.

21. The conveyor system of claim 1, wherein the controller cards are operatively connected via one or more communication cables.

22. The conveyor system of claim 21, wherein the communication cable includes a main communication channel and a sideband communication channel.

23. The conveyor system of claim 22, wherein the sideband communication channel is configured to communicate data using a RJ485 serial protocol.

24. The conveyor system of claim 1, wherein the controller cards have a user interface configured to propagate card settings to the other controller cards.

\* \* \* \* \*